US011941645B1

(12) United States Patent
Guzman et al.

(10) Patent No.: US 11,941,645 B1
(45) Date of Patent: *Mar. 26, 2024

(54) METHODS AND SYSTEMS TO EXTRACT SIGNALS FROM LARGE AND IMPERFECT DATASETS

(71) Applicant: Economic Alchemy Inc., New York, NY (US)

(72) Inventors: Giselle Claudette Guzman, New York, NY (US); Lawrence Klein, Gladwyne, PA (US)

(73) Assignee: ECONOMIC ALCHEMY INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/101,868

(22) Filed: Jan. 26, 2023

Related U.S. Application Data

(63) Continuation of application No. 13/677,276, filed on Nov. 14, 2012, now Pat. No. 11,599,892.

(Continued)

(51) Int. Cl.
*G06Q 30/02* (2023.01)
(52) U.S. Cl.
CPC .................................. *G06Q 30/02* (2013.01)
(58) Field of Classification Search
CPC ....................................................... G06Q 30/02
See application file for complete search history.

(56) References Cited

U.S. PATENT DOCUMENTS

| 5,521,814 A | 5/1996 | Teran |
| 5,701,400 A | 12/1997 | Amado |

(Continued)

FOREIGN PATENT DOCUMENTS

| EP | 2182481 A1 | 5/2010 |
| KR | 20060123116 A | 12/2006 |

(Continued)

OTHER PUBLICATIONS

Benoit Champagne, Adaptive Eigendecomposition of Data Covariance Matrices Based on First-Order Perturbations, IEEE Transactions on Signal Processing, vol. 42, No. 10, Oct. 1994, pp. 2758-2770 (Year: 1994).*

(Continued)

*Primary Examiner* — Andre D Boyce
(74) *Attorney, Agent, or Firm* — MUNCY, GEISSLER, OLDS & LOWE, P.C.

(57) ABSTRACT

A method for improving processing of data from a plurality of data sources by extracting signals from data sets includes retrieving the data from the plurality of data sources, generating a correlation matrix or a covariance matrix based on the retrieved data, performing an eigenvalue decomposition on the correlation matrix or the covariance matrix to determine a set of eigenvector loadings, and converting a result of the eigenvalue decomposition into an indicator of a common signal among the retrieved data. Converting the result of the eigenvalue decomposition into the indicator of the common signal includes applying a loading from the set of eigenvector loadings as a weight to at least one corresponding observation in the retrieved data from the plurality of data sources, and recursively repeating the steps of retrieving, generating, performing, and converting.

20 Claims, 3 Drawing Sheets

Related U.S. Application Data

(60) Provisional application No. 61/629,227, filed on Nov. 14, 2011.

(56) References Cited

U.S. PATENT DOCUMENTS

| | | | |
|---|---|---|---|
| 5,727,161 A | 3/1998 | Purcell | |
| 5,812,988 A | 9/1998 | Sandretto | |
| 5,852,811 A | 12/1998 | Atkins | |
| 5,875,437 A | 2/1999 | Atkins | |
| 5,930,762 A | 7/1999 | Masch | |
| 5,946,667 A | 8/1999 | Tull | |
| 5,987,435 A | 11/1999 | Weiss | |
| 6,018,722 A | 1/2000 | Ray | |
| 6,038,540 A | 3/2000 | Krist | |
| 6,092,056 A | 7/2000 | Tull | |
| 6,125,355 A | 9/2000 | Bekaert | |
| 6,341,271 B1 | 1/2002 | Salvo | |
| 6,366,870 B2* | 4/2002 | Jarman | G06F 17/18 702/179 |
| 6,513,020 B1 | 1/2003 | Weiss | |
| 6,658,467 B1 | 12/2003 | Rice | |
| 6,792,399 B1 | 9/2004 | Phillips et al. | |
| 6,876,992 B1 | 4/2005 | Sullivan | |
| 7,062,447 B1 | 6/2006 | Valentine et al. | |
| 7,072,863 B1 | 7/2006 | Phillips | |
| 7,175,072 B2 | 2/2007 | Krishnan et al. | |
| 7,191,150 B1 | 3/2007 | Shao | |
| 7,415,432 B1 | 8/2008 | Gianakouros et al. | |
| 7,464,006 B1* | 12/2008 | Huang | G06Q 40/06 702/190 |
| 7,474,985 B1 | 1/2009 | Pugh et al. | |
| 7,480,659 B2 | 1/2009 | Chmura | |
| 7,546,265 B1 | 6/2009 | Donner | |
| 7,599,872 B2 | 10/2009 | Dundas et al. | |
| 7,664,693 B1 | 2/2010 | von Groll et al. | |
| 7,676,375 B1 | 3/2010 | Neifeld | |
| 7,707,091 B1 | 4/2010 | Kauffman | |
| 7,730,019 B1 | 6/2010 | Graham | |
| 7,769,657 B2 | 8/2010 | Chacko et al. | |
| 7,958,204 B1 | 6/2011 | Phillips | |
| 8,108,290 B2 | 1/2012 | Speth | |
| 8,156,035 B2 | 4/2012 | Ferguson et al. | |
| 8,190,458 B2 | 5/2012 | Back | |
| 8,200,477 B2 | 6/2012 | Yi | |
| 8,229,866 B2 | 7/2012 | Alaniz | |
| 8,234,201 B1 | 7/2012 | Canabarro | |
| 8,250,009 B1 | 8/2012 | Breckenridge | |
| 8,275,637 B1 | 9/2012 | Glacy | |
| 8,335,735 B1 | 12/2012 | Chafkin | |
| 8,346,647 B1 | 1/2013 | Phelps et al. | |
| 8,364,518 B1 | 1/2013 | Blake et al. | |
| 8,407,118 B1 | 3/2013 | Zazelenchuk et al. | |
| 8,433,640 B2 | 4/2013 | Rooney | |
| 8,452,677 B1* | 5/2013 | de la Houssaye | G06Q 40/04 705/35 |
| 8,515,851 B2 | 8/2013 | Cardoza et al. | |
| 8,533,082 B1 | 9/2013 | Sudjianto et al. | |
| 8,533,089 B1 | 9/2013 | Renshaw | |
| 8,566,067 B2 | 10/2013 | Johnson | |
| 8,606,681 B2 | 12/2013 | O'Rourke | |
| 8,798,399 B2* | 8/2014 | Huang | G06T 7/0012 382/302 |
| 9,508,082 B1 | 11/2016 | Mannix et al. | |
| 9,547,477 B2 | 1/2017 | Mun | |
| 10,038,703 B2 | 7/2018 | Liu et al. | |
| 10,296,857 B2 | 5/2019 | Martin et al. | |
| 10,430,848 B2 | 10/2019 | Cotton et al. | |
| 10,838,965 B1 | 11/2020 | Todd et al. | |
| 2002/0023045 A1 | 2/2002 | Feilbogen et al. | |
| 2002/0151992 A1 | 10/2002 | Hoffberg | |
| 2003/0018548 A1 | 1/2003 | Cattaneo | |
| 2003/0035468 A1 | 2/2003 | Corbaton | |
| 2003/0046212 A1 | 3/2003 | Hunter et al. | |
| 2003/0074244 A1 | 4/2003 | Braxton | |
| 2003/0093347 A1 | 5/2003 | Gray | |
| 2003/0105703 A1 | 6/2003 | Palsky | |
| 2003/0130975 A1 | 7/2003 | Muller | |
| 2003/0149586 A1 | 8/2003 | Chen | |
| 2003/0225719 A1* | 12/2003 | Juang | G10L 15/063 706/48 |
| 2004/0015376 A1 | 1/2004 | Zhu | |
| 2004/0024606 A1 | 2/2004 | Chukwu | |
| 2004/0030624 A1 | 2/2004 | Nishimaki | |
| 2004/0073506 A1 | 4/2004 | Tull | |
| 2004/0172352 A1 | 9/2004 | Deretz | |
| 2004/0181422 A1 | 9/2004 | Brand | |
| 2004/0186803 A1 | 9/2004 | Weber | |
| 2004/0193524 A1 | 9/2004 | Almeida et al. | |
| 2004/0202914 A1 | 10/2004 | Sridhar | |
| 2004/0204775 A1 | 10/2004 | Keyes | |
| 2004/0267684 A1 | 12/2004 | Erdem | |
| 2005/0016947 A1 | 1/2005 | Fatke et al. | |
| 2005/0021517 A1 | 1/2005 | Marchisio | |
| 2005/0021577 A1 | 1/2005 | Marchisio | |
| 2005/0071300 A1 | 3/2005 | Bartlett et al. | |
| 2005/0080704 A1 | 4/2005 | Erlach | |
| 2005/0096893 A1 | 5/2005 | Feraille | |
| 2005/0102175 A1 | 5/2005 | Dudat | |
| 2005/0119922 A1 | 6/2005 | Eder | |
| 2005/0228591 A1 | 10/2005 | Hur et al. | |
| 2005/0240465 A1 | 10/2005 | Kiran | |
| 2005/0262002 A1 | 11/2005 | Manning | |
| 2005/0273319 A1 | 12/2005 | Dittmar et al. | |
| 2005/0273376 A1 | 12/2005 | Ouimet et al. | |
| 2005/0273377 A1 | 12/2005 | Ouimet et al. | |
| 2006/0004653 A1 | 1/2006 | Strongin | |
| 2006/0085455 A1 | 4/2006 | Chmura | |
| 2006/0190303 A1 | 8/2006 | Yourist | |
| 2006/0248096 A1 | 11/2006 | Adam | |
| 2006/0262865 A1 | 11/2006 | Moran | |
| 2006/0282380 A1 | 12/2006 | Birney | |
| 2007/0086513 A1 | 4/2007 | Ferdandez-Corbaton | |
| 2007/0129838 A1 | 6/2007 | Bendix | |
| 2007/0130060 A1 | 6/2007 | Ariarajah | |
| 2007/0208599 A1 | 9/2007 | Cornford | |
| 2007/0239571 A1 | 10/2007 | Michaletz | |
| 2007/0244785 A1 | 10/2007 | Williams | |
| 2007/0282758 A1 | 12/2007 | Vischer | |
| 2007/0288336 A1 | 12/2007 | Malaviya et al. | |
| 2008/0052097 A1 | 2/2008 | Bouzas | |
| 2008/0071588 A1 | 3/2008 | Eder | |
| 2008/0120250 A1 | 5/2008 | Hiatt | |
| 2008/0222052 A1 | 9/2008 | Choueifaty | |
| 2008/0270314 A1 | 10/2008 | Birney | |
| 2008/0281581 A1 | 11/2008 | Henshaw | |
| 2008/0288596 A1 | 11/2008 | Smith | |
| 2008/0319712 A1 | 12/2008 | Claps | |
| 2008/0319829 A1 | 12/2008 | Hunt | |
| 2008/0319923 A1 | 12/2008 | Casey et al. | |
| 2009/0018891 A1 | 1/2009 | Eder | |
| 2009/0018996 A1 | 1/2009 | Hunt | |
| 2009/0043637 A1 | 2/2009 | Eder | |
| 2009/0043713 A1 | 2/2009 | Weber | |
| 2009/0076987 A1 | 3/2009 | Chmura | |
| 2009/0097772 A1 | 4/2009 | Zhao | |
| 2009/0119200 A1 | 5/2009 | Riviere | |
| 2009/0132347 A1 | 5/2009 | Anderson | |
| 2009/0172821 A1 | 7/2009 | Daira et al. | |
| 2009/0177589 A1 | 7/2009 | Edgar | |
| 2009/0204446 A1 | 8/2009 | Simon et al. | |
| 2009/0217302 A1 | 8/2009 | Grechanik | |
| 2009/0238426 A1 | 9/2009 | Fear et al. | |
| 2009/0254389 A1 | 10/2009 | Teal | |
| 2009/0254395 A1 | 10/2009 | Lynn | |
| 2009/0254971 A1 | 10/2009 | Herz et al. | |
| 2009/0265281 A1 | 10/2009 | Cohen | |
| 2009/0281964 A1 | 11/2009 | Broms et al. | |
| 2009/0292662 A1 | 11/2009 | Ueno et al. | |
| 2009/0307057 A1 | 12/2009 | Azout | |
| 2009/0319436 A1 | 12/2009 | Andra | |
| 2010/0036529 A1 | 2/2010 | Landells | |
| 2010/0042553 A1 | 2/2010 | Van Erlach | |
| 2010/0070485 A1 | 3/2010 | Parsons | |

(56) References Cited

U.S. PATENT DOCUMENTS

| | | |
|---|---|---|
| 2010/0076785 A1 | 3/2010 | Mehta |
| 2010/0076904 A1 | 3/2010 | Ghosh |
| 2010/0076966 A1 | 3/2010 | Strutton |
| 2010/0119053 A1 | 5/2010 | Goeldi |
| 2010/0121707 A1 | 5/2010 | Goeldi |
| 2010/0121843 A1 | 5/2010 | Goeldi |
| 2010/0125532 A1 | 5/2010 | Cohen |
| 2010/0145773 A1 | 6/2010 | Desai et al. |
| 2010/0179921 A1 | 7/2010 | Scheinerman |
| 2010/0179930 A1 | 7/2010 | Teller |
| 2010/0185716 A1 | 7/2010 | Nakamura et al. |
| 2010/0204967 A1 | 8/2010 | Mun |
| 2010/0205117 A1 | 8/2010 | Van Erlach |
| 2010/0205124 A1 | 8/2010 | Ben-Hur |
| 2010/0205131 A1 | 8/2010 | Kumar |
| 2010/0228685 A1 | 9/2010 | Barsade |
| 2010/0262597 A1 | 10/2010 | Han |
| 2010/0305913 A1 | 12/2010 | Johnson |
| 2010/0312724 A1 | 12/2010 | Pinckney |
| 2011/0040635 A1 | 2/2011 | Simmons |
| 2011/0060572 A1 | 3/2011 | Brown |
| 2011/0071857 A1 | 3/2011 | Malov |
| 2011/0071885 A1 | 3/2011 | Ayres de Castro |
| 2011/0106578 A1 | 5/2011 | Cerminaro |
| 2011/0106589 A1 | 5/2011 | Blomberg |
| 2011/0112995 A1 | 5/2011 | Chang |
| 2011/0125623 A1 | 5/2011 | DeLillio |
| 2011/0137825 A1 | 6/2011 | Weber |
| 2011/0145126 A1 | 6/2011 | Rooney |
| 2011/0153412 A1 | 6/2011 | Novikov |
| 2011/0153451 A1 | 6/2011 | Bitz |
| 2011/0191372 A1 | 8/2011 | Klaushansky |
| 2011/0202475 A1 | 8/2011 | Choueifaty |
| 2011/0246155 A1 | 10/2011 | Fitch |
| 2011/0246179 A1 | 10/2011 | O'Neil |
| 2011/0251974 A1 | 10/2011 | Woodard |
| 2011/0282943 A1 | 11/2011 | Anderson |
| 2011/0302106 A1 | 12/2011 | Nosegbe |
| 2012/0019307 A1 | 1/2012 | Ludwig |
| 2012/0023040 A1 | 1/2012 | Benoit |
| 2012/0030082 A1 | 2/2012 | Voltz |
| 2012/0036085 A1 | 2/2012 | Srivastava |
| 2012/0041880 A1 | 2/2012 | Shai |
| 2012/0041937 A1 | 2/2012 | Dhillon |
| 2012/0046938 A1 | 2/2012 | Godbole |
| 2012/0047219 A1 | 2/2012 | Feng |
| 2012/0066024 A1 | 3/2012 | Strongin |
| 2012/0069131 A1 | 3/2012 | Abelow |
| 2012/0095802 A1 | 4/2012 | Wilberding |
| 2012/0101805 A1 | 4/2012 | Barbosa |
| 2012/0101808 A1 | 4/2012 | Duong-Van |
| 2012/0116941 A1 | 5/2012 | Pazner |
| 2012/0143683 A1 | 6/2012 | Hertz |
| 2012/0143738 A1 | 6/2012 | McConnel |
| 2012/0143739 A1 | 6/2012 | Lopez de Prado |
| 2012/0143740 A1 | 6/2012 | Lopez de Prado |
| 2012/0143741 A1 | 6/2012 | Lopez de Prado |
| 2012/0158613 A1 | 6/2012 | Bollen |
| 2012/0166330 A1 | 6/2012 | Kemp |
| 2012/0173302 A1 | 7/2012 | Dooley |
| 2012/0179692 A1 | 7/2012 | Hsiao |
| 2012/0185544 A1 | 7/2012 | Chang |
| 2012/0191730 A1 | 7/2012 | Parikh |
| 2012/0203684 A1 | 8/2012 | Gilbert |
| 2012/0215717 A1 | 8/2012 | Arnott |
| 2012/0226645 A1 | 9/2012 | O'Rourke |
| 2012/0246048 A1 | 9/2012 | Cohen |
| 2012/0316904 A1 | 12/2012 | Eder |
| 2012/0323674 A1 | 12/2012 | Simmons |
| 2012/0330810 A1 | 12/2012 | Dadkar |
| 2013/0041841 A1 | 2/2013 | Lyons |
| 2013/0041848 A1 | 2/2013 | Stubbs |
| 2013/0060603 A1 | 3/2013 | Wagner |
| 2013/0218736 A1 | 8/2013 | Eisen et al. |
| 2013/0297479 A1 | 11/2013 | Rooney |
| 2013/0332391 A1 | 12/2013 | Renshaw |
| 2013/0342538 A1 | 12/2013 | Kozine et al. |
| 2014/0012776 A1 | 1/2014 | Lo |
| 2014/0046872 A1 | 2/2014 | Arnott |
| 2014/0067279 A1 | 3/2014 | George et al. |
| 2014/0108059 A1 | 4/2014 | Ring et al. |
| 2014/0257829 A1 | 9/2014 | Schuetz et al. |
| 2014/0278472 A1 | 9/2014 | Guetz |
| 2014/0372172 A1 | 12/2014 | Frías Martínez et al. |
| 2015/0127425 A1 | 5/2015 | Greene et al. |
| 2015/0142713 A1 | 5/2015 | Gopinathan et al. |
| 2016/0140584 A1 | 5/2016 | Moghtaderi |
| 2016/0379388 A1 | 12/2016 | Rasco et al. |
| 2017/0300824 A1 | 10/2017 | Peng et al. |

FOREIGN PATENT DOCUMENTS

| | | |
|---|---|---|
| KR | 100930505 B1 | 12/2009 |
| WO | 2002099601 A2 | 12/2002 |
| WO | 2006121338 A1 | 11/2006 |
| WO | 2007106475 A2 | 9/2007 |
| WO | 2011119509 A1 | 2/2011 |
| WO | 2011095988 A2 | 8/2011 |

OTHER PUBLICATIONS

Pula, Gabor et al.; "Can Business Confidence Indicators Be Useful to Predict Short-Term Industrial Growth in Hungary?"; Magyar Nemzeti Bank, MNB Background Studies Mar. 2002; Sep. 2002; 38 pages.

Giannone, Domenico et al.; "Nowcasting GDP and Inflation: The Real-Time Informational Content of Macroeconomic Data Releases"; Finance and Economics Discussion Series, Divisions of Research & Statistics and Monetary Affairs, Federal Reserve Board, Washington D.C.; Sep. 2005, 42 pages.

Giannone, Domenico et al.; "Monetary Policy in Real Time"; NBER Macroeconomics Annual 2004, vol. 19, Apr. 2005; 65 pages.

Giannone, Domenico et al.; "Nowcasting GDP and Inflation: The Real-Time Informational Content of Macroeconomic Data Releases"; European Central Bank (ECB); ECB Working Paper No. 633, 2006; 51 pages.

Giannone, Domenico et al.; "Incorporating Conjunctural Analysis in Structural Models"; Mar. 21, 2008; 24 pages.

Angelini, Elena et al., "Short-Term Forecasts of Euro Area GDP Growth"; European Central Bank, Working Paper Series, No. 949, Oct. 2008; 31 pages.

Giannone, Domenico et al.; "Nowcasting Euro Area Economic Activity in Real-Time: The Role of Confidence Indicators"; Centre for Studies in Economics and Finance, Working Paper No. 240; Nov. 2009; 24 pages.

Banbura, Marta et al.; "Nowcasting with Daily Data"; Oct. 21, 2011; 31 pages.

Wikipedia; "Nowcasting (Economics)"; Dec. 19, 2010; 3 pages.

Wikipedia; "Nowcasting (Economics)—Old Revisions"; Dec. 19, 2010; 13 pages.

Schreyer, Paul et al.; "Short-Term Indicators: Using Qualitative Indicators to Update Production Indices"; OECD Science, Technology and Industry Working Papers Mar. 1996, 1996; 23 pages.

Baffigi, Alberto et al.; "Real-Time GDP Forecasting in the Euro Area"; Banca D'Italia, Temi di discussione del Servizio Studi, No. 456, Dec. 2002; 42 pages.

Antenucci, Dolan et al.; "Ringtail: Feature Selection for Easier Nowcasting"; 16th International Workshop on the Web and Databases, Jun. 23, 2013, New York, NY; 6 pages.

Giusto, Andrea et al.; "Nowcasting U.S. Business Cycle Turning Points with Vector Quantization"; Dalhousie University, Department of Economics, Sep. 2013; 35 pages.

Herrmannova, Lenka; "Forecasting and Nowcasting Power of Confidence Indicators: Evidence for Central Europe"; Charles University in Prague, Instutute of Economic Studies, Rigorous Thesis, Sep. 9, 2013; 140 pages.

Picerno, James; "Nowcasting the Business Cycle: A Practical Guide for Spotting Business Cycle Peaks Ahead of the Crowd"; Beta Publishing, 2014; 6 pages.

(56) References Cited

OTHER PUBLICATIONS

O'Donoghue, Cathal et al.; "Nowcasting in Microsimulation Models: A Methodological Survey"; Journal of Artificial Societies and Social Simulation 17 (4) 12, Oct. 31, 2014, 11 pages.
Brave, Scott A. et al.; "Nowcasting Using the Chicago Fed National Activity Index"; Federal Reserve Bank of Chicago, 2014; 107 pages.
Higgins, Patrick; "GDP Now: A Model for GDP 'Nowcasting'"; Working Paper No. 2014-7, Federal Reserve Bank of Atlanta, 2014; 87 pages.
Duffy, David et al.; "Quarterly Economic Commentary"; The Economic and Social Research Institute, Oct. 8, 2014; 100 pages.
Kourentzes, Nikolaos et al.; "Increasing Knowledge Base for Nowcasting GDP by Quantifying the Sentiment About the State of Economy"; Workshop on Using Big Data for Forecasting and Statistics, Feb. 15, 2014; 16 pages.
Kunovac, Davor et al.; "Nowcasting GDP Using Available Monthly Indicators"; Croatian National Bank, Working Papers W-39, Oct. 2014; 28 pages.
Massachusetts Institute of Technology; "The Emerging Pitfalls of Nowcasting with Big Data"; Aug. 18, 2014; 6 pages.
United Nations; "Handbook on Economic Tendency Surveys"; Statistical Papers, Series M, No. 96; 2015; 253 pages.
Caruso, Alberto; "Nowcasting Mexican GDP"; Ecares Working Paper 2015-40; Oct. 2015; 30 pages.
Henzel, Steffen et al.; "Nowcasting Regional GDP: The Case of the Free State of Saxony"; CESifo Working Paper, No. 5336; Apr. 2015; 29 pages.
Galbraith, John W. et al.; "Nowcasting GDP with Electronic Payments Data"; European Central Bank (ECB); ECB Statistics Paper No. 10; Aug. 2015; 21 pages.
Kovacs, Kevin et al.; "Nowcasting German Turning Points Using CUSUM Analysis"; The George Washington University Center of Economic Research, Research Program on Forecasting (RPF); RPF Working Paper No. 2016-014; Dec. 20, 2016; 18 pages.
Modugno, Michele et al.; "Nowcasting Turkish GDP and News Decomposition"; Finance and Economics Discussion Series 2016-044; May 2016; 40 pages.
Abdalla, Ahmed; "The Power of Aggregate Book-to-Market Innovations: Forecasting, Nowcasting, and Dating the Real Economy"; London School of Economics; Jul. 2016; 52 pages.
Kim, Hyan Hak et al.; "Methods for Pastcasting, Nowcasting and Forecasting Using Factor-MIDAS"; Aug. 2016; 50 pages.
Diebold, Francis X.; "Forecasting in Economics, Business, Finance and Beyond"; University of Pennsylvania, Edition 2017, Aug. 1, 2017; 619 pages.
Chernis, Tony et al.; "A Dynamic Factor Model for Nowcasting Canadian GDP Growth"; Bank of Canada Working Paper No. 2017-2, Feb. 2017; 30 pages.
Marsilli, Clement; "Nowcasting US Inflation Using a Midas Augmented Phillips Curve"; Int. J. Computational Economics and Econometrics, vol. 7, Nos. 1/2, 2017; 14 pages.
Dahlhaus, Tatjana et al.; "Nowcasting BRIC+M in Real Time"; Bank of Canada Working Paper No. 2015-38, Oct. 2015; 45 pages.
Antolin-Diaz, Juan et al.; "Advances in Nowcasting Economic Activity"; XIII Annual Conference on Real-Time Data Analysis, Bank of Spain, Oct. 19, 2017; 50 pages.
Glaeser, Edward L. et al.; "Nowcasting the Local Economy: Using Yelp Data to Measure Economic Activity"; Harvard Business School, Working Paper 18-022, Oct. 2017; 56 pages.
Dartmouth College, Tuck School of Business, Elective Courses, 2020; 54 pages.
"King's College London PHD Studentships in Economic Measurement: Economic Statistics, Centre of Excellence 2017, UK"; 2017; 6 pages.
University of Kansas Economics; Student Conference Presentations 2007-2015; 7 pages.
Federal Reserve Bank of New York, Research and Statistic Group, Research Analyst Program; 2018; 12 pages.

"Advanced Workshop for Central Bankers"; Centre for International Macroeconomics, Northwestern University, Sep. 6-13, 2016; 6 pages.
MIT Center for Digital Business, 2012 Calendar of Events; 2 pages.
Columbia University, Quantitative Methods in the Social Sciences (QMSS) Courses, 2012; 7 pages.
Midwest Economics Group (MEG) Program, 26th Annual Meeting of the Midwest Economics Group, Department of Economics, University of Illinois at Urbana-Champaign, Oct. 21-22, 2016; 14 pages.
European Commission, Collaboration in Research and Methodology for Official Statistics, "Workshop on Using Big Data for Forecasting and Statistics"; Apr. 7-8, 2014; 4 pages.
Norges Bank, Central Bank of Norway, "Recent Developments in the Econometrics of Macroeconomics and Finance"; Jun. 2-4, 2010; 2 pages.
Brandeis University, Econ/Fin250a Introduction, Spring 2018; 4 pages.
Federal Reserve Bank of Atlanta; "Nowcast for Real Gross Private Domestic Investment: Fixed Investment: Business"; Mar. 1, 2018; 34 pages.
Nowcasting Scotland, "February Nowcasts!"; Feb. 6, 2018; 2 pages.
PwC Global; "Economic Integration: The Key to Unlocking ASEAN's Export Potential?"; Global Economy Watch Monthly Macroeconomic Publication, Oct. 2017; 6 pages.
Fulcrum Asset Management; "Global Surveys or Hard Data—Which are the Fake News?"; 2016; 3 pages.
American Economic Association; "JOE—Dec. 2013"; 3 pages.
American Economic Association; "JOE Listings (Job Openings for Economists)"; Feb. 1, 2017-Jul. 31, 2017; 2 pages.
M. Ege Yazgan Curriculum Vitae, 2014; 1 page.
Simon Kirby Curriculum Vitae, National Institute of Economic and Social Research, 2017; 3 pages.
Jack Fosten Introduction, Google, 2017; 1 page.
Carl Bonham, UHERO Executive Director and Professor of Economics, University of Hawaii, 2018; 2 pages.
Ahmed M. Abdalla Curriculum Vitae, 2017; 4 pages.
Amihud, Yakov; "Illiquidity and Stock Returns: Cross-Section and Time-Series Effects"; Journal of Financial Markets 5 (2002) pp. 31-56.
"U.S. Appl. No. 13/677,273, Notice of Allowance dated Oct. 1, 2014", 8 pgs.
"U.S. Appl. No. 13/677,273, Non-Final Office Action dated Mar. 25, 2014", 14 pqs.
"U.S. Appl. No. 13/677,277, Non-Final Office Action dated Oct. 15, 2014", 6 pqs.
"U.S. Appl. No. 13/677,277, Non-Final Office Action dated Mar. 24, 2014", 5 pgs.
"U.S. Appl. No. 13/677,278, Final Office Action dated Oct. 9, 2014", 13 pgs.
"U.S. Appl. No. 13/677,278, Restriction Requirement dated Dec. 24, 2013", 7 pqs.
"U.S. Appl. No. 13/677,278, Non-Final Office Action dated May 22, 2013", 10 pgs.
"U.S. Appl. No. 13/677,297, Non-Final Office Action dated Jan. 16, 2014", 8 pgs.
"U.S. Appl. No. 13,677,297, Non-Final Office Action dated Oct. 23, 2014", 13 pgs.
Tanaka-Yamawaki, Mieko, "Cross Correlation of Intra-Day Stock Prices in Comparison to Random Matrix Theory", Intelligent Information Management, (May 2011), pqs 65-70.
Ozertem et al., "Recursive Generalized Eigendecomposition for Independent Component Analysis", Independent Component Analysis and Blind Signal Separation, vol. 3889, (2006), pp. 198-205.
"CBOE S&P 500 Implied Correlation Index", Chicago Board Options Exchange, Incorporated, (2009), 9 pgs.
Guzman, Giselle, "Internet Search Behavior as an Economic Forecasting Tool: The Case of Inflation Expectations", Journal of Economic and Social Measurement, 36, (2011), 119-167.
Guzman, Giselle, "Sexonomics: Gender, Wealth, and Expectations in Financial Markets", Journal of Economic and Social Measurement, 37, (2012), 1-60.

(56) References Cited

OTHER PUBLICATIONS

Guzman, Giselle, "Using Sentiment Surveys to Predict GDP Growth and Stock Returns", The Making of National Economic Forecasts, Chapter 12, 319-351.

Klein, Lawrence R, "The Making of National Economic Forecasts", Edward Elgar Publishing Limited, Northampton, MA, USA, (2009), 403 pgs.

Schmidt, Thorsten, "Correlation and Correlation Risk", University of Leipzig, Dep. Of Mathematics, 4 pqs.

Driessen et al., "The Price of Correlation Risk: Evidence from Equity Options", The Journal of Finance, vol. 64, No. 3, (Jun. 2009), 30 pqs.

Matheson, Troy D. {Jan. 2010). "An analysis of the informational content of New Zealand data releases: The Importance of business opinion surveys", Economic Modeling {Elsevier) 27 {1); 304-314. http://lwww.sciencedirecl.com/science/article/pii/S0264999309001679.

M. Woodford, Interest and Prices, Princeton University Press, Princeton, 2003.

Guzman, GDP Growth Signals, Investor Psychology, and Hedging Pressure: A Multivariable Approach to Forecasting Returns on the S&P500 Index, Independent Study, The Wharton School, University of Pennsylvania, J003. [no pdf—citation only].

Hoffman et al., "Are Brand Attitudes Contagious? Consumer Response to Organic Search Trends", Nov. 2009.

Bardhan et al., "The Past as Prologue? Business Cycles and Forecasting since the 1960s", Fisher Center for Real Estate and Urban Economics, UC Berkeley.

Radinsky et al., "Predicting the News of Tomorrow Using Patterns in Web Search Queries", Proceedings of the 2008 IEEE/WIC/ACM International Conference on Web Intelligence, 2008.

Brownstein et al., "Digital Disease Detection—Harnessing the Web for Public Health Surveillance," The New England Journal of Medicine; May 21, 2009.

Cooper et al., "Cancer Internet Search Activity on a Major Search Engine, United States 2001-2004," J Med Internal Res, 7, 2005.

Corely, et al., "Monitoring Influenza Trends Through Mining Social Media," Proceedings of the 2009 International Conference on Bioinformatics and Computational Biology {BIOCOMP09}, 2009.

Hulth et al., "Web Queries as a Source of Syndromic Surveillance," Department of Epidemiology, Swedish Institute of Infectious Disease Control, PLoS One, 5, 2009.

Polgreen et al., "Using Internet Searches for Influenza Surveillance," Healthcare Epidemiology, 47:1443-1448, Dec. 2008.

Wilson et al., "Early Detection of Disease Outbreaks Using the Internet," CMAJ, Mar. 12, 2009.

Clements et al., "Report of a Scoping Study of Forecasting in the National Accounts at the Office for National Statistics," Statistics Commission, Mar. 5, 2003.

Guzman, Giselle, "Internet Search Behavior as an Economic Forecasting Tool: The Case of Inflation Expectations," Nov. 29, 2011.

Klein, et al., "The University of Pennsylvania Model for High-Frequency Economic Forecasting," Economic & financial Modeling, Autumn 1995.

Klein et al., "Combinations of High and Low Frequency Data in Macroeconomics Models," University of Pennsylvania.

Giannone, Domenico; Reichlin, Lucrezia; Small, David, (May 2008), "Nowcasting: The real-time informational content of macroeconomic data," Journal of Monetary Economics (Elsevier) 55(4): 665-676.

Camacho, Maximo; Perez-Quiros, Gabriel (2010), "Introducing the euro-sting: Short-term indicator of Euro Area Growth," Journal of Applied Econometrics (John Wiley & sons) 25 (4): 663-694.

Evans, Martin D.D. (Sep. 2005). "Where Are We Now? Real-Time Estimates of the Macroeconomy," International Journal of Central Banking 1 (2).

Runstler, G.; Barhoumi, K.; Benk, S.; Cristadoro, R.; Den Reijer, A.; Jakaltiene, A.; Jelonek, P.; Rua, A.; Ruth, K.; Van Nieuwenhuyze, C. (2009), "Short-term forecasting of GDP using large datasets: a pseudo real-time forecast evaluation exercise," Journal of Forecasting (John Wiley & Sons) 28(7) 595-611.

Domenico, Giannone, et al. (Nov. 23, 2009), "Is the UK still in recession? We don't think so." Vox.

Banbura, Marta; Giannone, Ddomenico; et al., "Nowcasting," Working Papers ECARES 2010-021, Oxford Handbook on Economic Forecasting (2010).

Andreou, Elena, et al., "Forecasting with Mixed-Frequency Data," Oxford Handbook of Economic Forecasting, (2010).

Andreou, Elena et al., "Regression models with Mixed Sampling Frequencies," Journal of Econometrics, (2010), 246-261.

A. Ang, et al., "Do macro variables, asset markets, or surveys forecast inflation better?" Journal of Monetary Economics, 54 (2007), 1163-1212.

C. Anvik and K. Gjelstad, "Just Google It," Forecasting Norwegian unemployment: figures with web queries. Center for Research in Economics and Management CREAM Publication 11 (2010).

N. Askitas and K. Zimmerman, "Google econometrics and unemployment forecasting," Applied Economics Quarterly 55(2) (2009), 107-120.

G. Calvo, "Staggered prices in a utility-maximizing framework," Journal of Monetary Economics 12 (1983), 383-398.

C. Caroll, "Macroeconomic expectations of households and professional forecasters," The Quarterly Journal of Economics 118(1) (2003), 269-298.

H. Choi and H. Varian, "Predicting the present with Google Trends," www.google.com/googleblogs/ . . . /googlepredictingthepresenl.pdf (2009).

H. Choi and H. Varian, "Predicting initial claims for unemployment benefits," research.google.com/archive/papers/initialclaimsUS.pdf (2009).

A. Constant and K. Zimmerman, "Face to face with the financial crisis: The U.S. Presidential election from a transnational perspective," German Institute for Economic Research Weekly Report 16/2008 (4)(2009).

F. D'Amuri, "Predicting unemployment in short samples with internet job search query data," MPRA Paper 18403 (2009).

F. D'Amuri and J. Marcucci, "Google II" Forecasting the US unemployment rate with a Google job search index, Fondazione Eni Ennco Mattei Working Papers, 421 (2010).

R.F. Engle and CWJ Granger, "Co-integration and error correction: Representation, estimation, and testing," Econometrica 55 (1987), 251-276.

G. Eysenbach, "Infodemiology: Tracking flu-related searches on the web for syndromic suveillance," AMIA 2006, Symposium Proceedings (2006), 244-248.

D. Giannone, et al., "Nowcasling: The real-lime informational content of macroeconomics data," Journal of Monetary Economics 55 (2008), 665-676.

J. Ginsberg, et al. "Detecting influenza epidemics using search engine query data," Nature 457 (19) (2009).

S. Goel, et al, "Predicting consumer behavior with web search," PNAS Early Edition (2010).

E.M. Gramlich, "Models of inflation expectations formation: A comparison of household and economist forecasts," Journal of Money, Credit, and Banking, 15(2) (1983), 155-173.

CWJ Granger, et al., "Forecasting Economic Time Series," Academic Press, Florida, 1977, pp. vii viii, ix, 13, 14, 25.

AP Grant et al, "Inflationary expectations and rationality revistied," Economics Letters 62 (1999), 331-338.

Guzman, "Using sentiment surveys to predict GDP growth and stock returns," in The Making of National Forecasts, LR Klein, ed., Edward Elgar Publishing Lid., London, 2009, 319-351.

D. Harvey et al, "Testing the equality of prediction mean squared errors," International Journal of Forecasting, 13 (1997), 281-291.

R. Kulkarni et al., "Forecasting housing prices with Google econometrics," George Mason University School of Public Policy Research Paper 10 (2009).

M. Lanne, et al., "A naive sticky information model of households' expectations," Journal of Economic Dynamics & Control, 33 (2009), 1332-1344.

(56) References Cited

OTHER PUBLICATIONS

G. Mankiw and R. Reis, "Sticky information versus sticky prices. A proposal to replace the New Keynesian Phillips Curve," The Quarterly Journal of Economics 117(4) (2002), 1295-1328.

R. Mariano and D. Preve, "Statistical Tests for Multiple Forecast Comparision," Presentation, TW Anderson Conference, Stanford University, 2008.

YP Mehra, "Survey measures of expected inflation: Revisting the issues of predictive content and rationality." Federal Reserve Bank of Richmond Economic Quarterly 88/3 (2002), 17-35.

WA Morgan, "A test for significance of the difference between the two variances in a sample from a normal to variate populations," Biometrika 31 (1939), 13-19.

PM Polgreen, et al., "Using internet searches for influenza surveillance," Clinical Infectious Diseases, 47(2008), 1443-1448.

J. Rillerman, et al. "Using prediction markets and Twitter to predict a swine flu pandemic," Proceedings of the 1st International Workshop on Mining Social Media (2009).

H. Song, et al., "Forecasting deman for hotel rooms with search engine query volume data," College of Charleston Working Paper (2009).

JH Stock, et al. "Forecasting inflation," Journal of Monetary Economics, 44(1999), 293-335.

JH Stock et al., "Macroeconomic forecasting using diffusion indexes," Journal of business & Economic Statistics, 20(2), (2002), 147-162.

T. Suhoy, "Query indices and a 2006 downturn: Israeli data," Bank of Israel Discussion Paper (2009).

T. Suhoy, "Monthly assessments of private consumption," Bank of Israel Discussion Paper (2010).

LB Thomas, "Survey measures of expected US inflation," The Journal of Economic Perspectives 13(4) (1999), 125-144.

S Vosen et al., "Forecasting private consumption: survey-based indicators vs. Google Trends," Journal of Forecasting, 10.1002, (2011).

Klein, LR, et al., "Economic Forecasting at high-frequency intervals," Journal of Forecasting, vol. 12, Issue 3-4, pp. 301-319 {Apr. 1993). http://onlinelibrary.wiley.com/doi/10.1002/for.3980120910/abstracl.

Preis et al., "Complex dynamics of our economic life on different scales: insights from search engine query data," Phil. Trans. R. Soc. A.2010 368, 5707-5719.

Harding, "Google to map inflation using web data," Financial Times, Oct. 11, 2010.

Vlastakis, et al., "Information Demand and Stock Market Volatility," Athena University, May 2010.

Zhi Da et al., "In Search of Attention," SSRN 1364209.

Finance Team "Google Domestic Trends," download date Jul. 17, 2015.

Sharad Goel, What can search predict? Messy Matters, Nov. 30, 2009.

Goel et al., "What can search predict?" Yahoo! Labs; Jan. 1, 1979.

Ettredge, et al., "Using web-based search data to predict macroeconomic statistics," Commun, ACM, 48(11) 87(92), J005.

Huang et al., "Constructing Consumer Sentiment Index for US Using Internet Search Patterns"; University of Alberta, Department of Economics, Working Paper No. 2009-26, Oct. 2009, 22 pages.

Shimshoni, et al. "Predictability of Trends," Google, Israel Labs, Aug. 17, 2009.

Somette, et al., "Endogenous versus exogenous shocks in complex network: an empirical test using book sale rankings," APS preprint, Feb. 2, 2006.

Valdivia et al., "Diseases tracked by using Google Trends," Emerging Infectious Diseases, vol. 16, No. 1, Jan. 2010.

Peiat et al., "More diseases tracked by using Google Trends," Emerging Infectious Diseases, 2009, 15:1327-8.

Lamiaa M. Elshenawy et al, Efficient Recursive Principal Component Analysis Algorithms for Process Monitoring, Ind. Eng. Chem. Res. 2010, 49, pp. 252-259 (Year: 2010).

Hamid Krim et al, Two decades of Array Signal Processin Research, IEEE Signal Processing Magazine ( vol. 13, Issue: 4, Jul. 1996), pp. 67-94 (Year: 1996).

Mouchart, Michel, et al.; "Clustered Panel Data Models: An Efficient Approach for Nowcasting from Poor Data"; Dec. 4, 2003; 30 pages.

Cors, Andreas et al.; "An Approach for Timely Estimations of the German GDP (Abstract)"; AStA Advances in Statistical Analysis, vol. 87, No. 2, 2003; 2 pages.

Baffigi, Alberto et al.; "Bridge Models to Forecast the Euro Area GDP (Abstract)"; International Journal of Foecasting, vol. 20, Issue 3, Jul.-Sep. 2004; 3 pages.

Mouchart, Michel, et al.; "Clustered Panel Data Models: An Efficient Approach for Nowcasting from Poor Data"; International Journal of Forecasting 21 (2005) 577-594; 2005; 18 pages.

Nunes, Luis C.; "Nowcasting Quarterly GDP Growth in a Monthly Coincident Indicator Model (Abstract)"; Journal of Forecasting, vol. 24, Issue 8; Dec. 20, 2005; 4 pages.

Altissimo, Filippo et al.; "New Eurocoin: Tracking Economic Growth in Real Time"; Centre for Economic Policy Reseach Discussion Paper Series, Discussion Paper No. 5633, Apr. 2006; 37 pages.

Banbura, Marta et al.; "A Look Into the Factor Model Black Box: Publication Lags and the Role of Hard and Soft Data in Forecasting GDP"; Nov. 2006; 26 pages.

Marcellino, Massimiliano et al.; "Factor-MIDAS for Now- and Forcasting with Ragged-Edge Data: A Model Comparision for German GDP"; Bank of England CCBS Research Forum, 2007; 41 pages.

Monti, Francesca; "Forecast with Judgement and Models"; National Bank of Belgium, Working Paper Research, No. 153, Dec. 2008; 44 pages.

Matheson, Troy et al.; "Nowcasting and Predicting Data Revisions in Real Time Using Qualitative Panel Survey Data"; Reserve Bank of New Zealand, DP2007/02, Jan. 2007; 25 pages.

Gelper, Sarah et al.; "The Predictive Power of the European Economic Sentiment Indicator"; Katholieke Universiteit Leuven, Department of Decision Sciences and Information Management, Jan. 22, 2007; 15 pages.

Galbraith, John W. et al.; "Electronic Transactions as High-Frequency Indicators of Economic Activity"; Bank of Canada, Working Paper 2007-58, Dec. 2007; 29 pages.

Clements, Michael P. et al.; "Macroeconomic Forecasting with Mixed-Frequency Data: Forecasting Output Growth In the United States"; Journal of Nusiness and Economic Statistics, Oct. 2008, 10 pages.

Darne, Olivier; "Using Business Survey in Industrial and Services Sector to Nowcast GDP Growth: The French Case"; Economic Bulletin, Jul. 2008; 10 pages.

Kholodilin, Konstantin A., et al.; "A New Business Barometer for Germany: Construction and Evaluation of the Nowcast Accuracy"; Nov. 18, 2008; 11 pages.

D'Agostino, Antonello, et al.; "Now-Casting Irish GDP"; Central Bank & Financial Servies Authroity of Ireland, Research Technical Paper, 9/RT/08, Nov. 2008; 25 pages.

Proietti, Tommaso; "Estimation of Common Factors under Cross-Sectional and Temporal Aggregation Constraints: Nowcasting Monthly GDP and its Main Components (Abstract)"; MPRA Paper, University Library of Munich, Germany, New Economic Papers, Jan. 22, 2008; 1 page.

Aastveit, Knut Are, et al.; "Estimating the Output Gap in Real-Time: A Factor Model Approach"; Dec. 9, 2008; 40 pages.

Lee, Kevin, et al.; "Nowcasting, Business Cycle Dating and the Interpreation of the New Information when Real Time Data are Available"; The University of Melbourne, Department of Economics, Research Paper No. 1040, May 2008; 45 pages.

Kuzin, Vladimir, et al.; "Pooling Versus Model Selection for Nowcasting with Many Predictors: An Application to German GDP"; Deutsche Bundesbank Eurosystem, Discussion Paper, Series 1: Economic Studies, No. Mar. 2009, 2009; 55 pages.

Castle, Jennifer, et al.; "Nowcasting is Not Just Contemporaneous Forecasting"; National Institute Economic Review, 2009; 26 pages.

(56) References Cited

OTHER PUBLICATIONS

Schorfheide, Frank et al.; "Evaluating DSGE Model Forecasts of Comovements"; University of Pennsylvania, Oct. 17, 2010; 57 pages.
Aruoba, A. Boragan, et al.; "Real-Time Macroeconomic Monitoring: Real Activity, Inflation, and Interactions"; National Bureau of Economic Research, Working Paper 15657, Jan. 2010; 17 pages.
Kholodilin, Konstantin A., et al.; "Do Google Searches Help in Nowcasting Private Consumption? A Real-Time Evidence for the US"; ETH Zurich, Research Collection, Working Paper, Apr. 2010; 29 pages.
Gilbert, Thomas, et al.; "Why Do Certain Macroeconomic News Announcements Have a Big Impact on Asset Prices?"; Apr. 6, 2010; 38 pages.
Rossiter, James; "Nowcasting the Global Economy"; Bank of Canada Discussion Paper 2010-12, Sep. 2010; 26 pages.
Norin, Anna; "Nowcasting of the Gross Regional Product"; 50th Congress of the European Regional Science Association: Sustainable Regional Growth and Development in the Creative Knowledge Economy, Aug. 19-23, 2010; 11 pages.
Liebermann, Joelle; "Real-Time Nowcasting of GDP: Factor Model Versus Professional Forecasters"; Munich Personal RePEc Archive, Dec. 2010; 36 pages.
Faust, Jon et al.; "Credit Spreads as Predictors of Real-Time Economic Activity: A Bayesian Model-Averaging Approach"; National Bureau of Economic Research, Working Paper 16725, Jan. 2011; 41 pages.
Askitas, Nikolaos et al.; "Nowcasting Business Cycles Using Toll Data"; IZA Discussion Paper No. 5522, Feb. 2011; 19 pages.
Lahiri, Kajal et al.; "Nowcasting US GDP: The Role of ISM Business Surveys"; SUNY Department of Economics, Mar. 2011; 30 pages.
Sorensen, Jonas; "Indicator Models for Private Consumption"; Monetary Review, 1st Quarter 2011, Part 1; 13 pages.
Garratt, Anthony et al.; "Measuring Output Gap Nowcast Uncertainty"; The Australian National University, Centre for Applied Macroeconomic Analysis (CAMA), CAMA Working Paper 16/2011, Jun. 2011; 24 pages.
Banbura, Marta et al., "Nowcasting," Working Papers ECARES 2010-021, Oxford Handbook on Economic Forecasting (2010), 36 pages.
Branch, William A.; "Nowcasting and the Taylor Rule"; University of California, Irvine, Jul. 11, 2011; 32 pages.
Carnot, Vincent et al.; "Economic Forecasting and Policy"; Second Edition, Chapter 2, Jul. 26, 2011; 8 pages.
Guzman, Giselle C.; "Using Sentiment to Predict GDP Growth and Stock Returns"; Preliminary Draft, Munich Personal RePEc Archive, Jun. 29, 2008, 41 pages.
Guzman, Giselle C.; "An Inflation Expectations Horserace"; Preliminary Draft, Munich Personal RePEc Archive, Jan. 25, 2010; 44 pages.
Guzman, Giselle C.; "The Case for Higher Frequency Inflation Expectations"; Preliminary Draft, Munich Personal RePEc Archive, Jun. 29, 2011; 44 pages.
Guzman, Giselle C.; "Internet Search Behavior as an Economic Forecasting Tool: The Case of Inflation Expectations"; Preliminary Draft, Munich Personal RePEc Archive, Nov. 29, 2011; 38 pages.
Vosen, Simeon et al.; "A Monthly Consumption Indicator for Germany Based on Internet Search Query Data"; Applied Economic Letters, vol. 19, Iss. 7, 2012; 27 pages.
Wieland, Volker et al.; "Macroeconomic Model Comparisons and Forecast Competitions"; Voxeu.org, Feb. 13, 2012; 4 pages.
Matteson, David S.; "Time-Frequency Functional Models: An Approach for Identifying and Predicting Economic Recessions in Real-Time"; Cornell University, Department of Statistical Science, May 17, 2014; 42 pages.
Molodtsova, Tanya et al.; "Taylor Rule Exchange Rate Forecasting During the Financial Crisis"; National Bureau of Economic Research, Working Paper 18330, Aug. 2012; 41 pages.
Scotti, Chiara et al.; "Real-Time Aggregation of Macroeconomic Surprises: A Real Activity Surprise Index"; Federal Reserve Board, Apr. 26, 2012; 24 pages.
Campbell, Jeffrey R. et al.; "Macroeconomic Effects of Federal Reserve Forward Guidance"; Working Paper 2012-03, Federal Reserve Bank of Chicago, 2012; 61 pages.
D'Agostino, Antonello et al.; "Survey-Based Nowcasting of US Growth: A Real-Time Forecast Comparison Over More Than 40 Years"; European Central Bank, Working Paper No. 1455, 2012; 23 pages.
Kuzin, Vladimir, et al.; "Pooling Versus Model Selection for Nowcasting GDP with Many Predictors: Empirical Evidence for Six Industrialized Countries"; Deutsche Bundesbank, 2013; 65 pages.
Hendry, David et al.; "Forecasting and Nowcasting Macroeconomic Variables: A Methodological Overview"; University of Oxford, Department of Economics, Discussion Paper No. 674, Sep. 2013; 74 pages.
Koop, Gary et al.; "Macroeconomic Nowcasting Using Google Probabilities"; Aug. 2013; 31 pages.
Muranga, J. et al., "Measurement of liquidity risk in the context of market risk calculation". a BIS volume entitled "The Measurement of Aggregate Risk" (1997) https://citeseerx.ist/psu/edu/viewdoc/download?doi=10.1.1.452.4012&rep=rep1&type=pdf, 22 pages.
Moghtaderi, et al., "Trend filtering via empirical mode decompositions." Computational Statistics & Data Analysis 58 (2013): 114-126, (Year: 2013).
Cristelli et al., The heterogeneous dynamics of economic complexity. PLoS One. Feb. 11, 2015;10(2):e0117174. doi:10.1371/journal.pone.0117174, PMID: 2567131, (Year: 2015).
https://www.markit.com/Company/Files/PressReleaseFile?CMSID= 7bc848f70957 4b9a99f4c56a71548aa0, Jun. 2016 (no longer available).
Finance Magnate, "European Commission Selects Markit for its Fixed Income Solution", Jun. 15, 2016, 3 pages. (https://www.financemagnates.com/institutional-forex/technology/european-commission-selects-markit-for-its-fixed-income-solution).
https://www.blackrock.com/us/individual/literature/whitepaper/bii-introduction-to-gps.pdf, Sep. 2016 (no longer available).
BlackRock Investment Institute, "BlackRock Macro Dashboard", 2019, 6 pages. (https://www.blackrock.com/corporate/insights/blackrock-investment-institute/data-visuals/macro-dashboard).
DeepMacro, "Frequently Asked Questions", 2016, 7 pages. (https://beta.deepmacro.com/faq).
"Ice Data Services Summary: Final SEC Rules for Liquidity Risk Management Programs", Jul. 7, 2017, 2 pages. (https://www.theice.com/market-data/pricing-and-analytics/analytics/liquidity/SECLRM, 2017).
"Ice Liquidity Indicators", Dec. 21, 2016, 3 pages. (https://web.archive.org/web/20161221065616/https://www.theice.com/market-data/pricing-and-analytics/analytics/liquidity).
Hoover, Kevin D. et al., "Data-mining reconsidered: encompassing and the general-to-specific approach to specific search", Econometrics Journal (1999), vol. 2, pp. 167-191.
"Diseases Tracked by Using Google Trends", Spain, Emerging Infectious Diseases, 111.cdc.gov/eid, vol. 16, No. 1, Jan. 2010.
Angelini, Elena et al., "Estimating and forecasting the euro area monthly national accounts from a dynamic factor model"; European Central Bank, Working Paper Series, No. 953, Oct. 2008, 31 pages.
Choudhry, Moorad et al., "Measuring Bond Market Liquidity: Devising a Composite Aggregate Liquidity Score"; Applied Financial Economics, vol. 20, 2010; pp. 955-973.
Agrrawal, Pankaj et al., "A Multivariate Liquidity Score and Ranking Device for ETFs," 2009, Academy of Financial Services, pp. 2-18.
Medo, Matus et al.; "How to quantify the influence of correlations on investment diversification", International Review of Financial Analysis; vol. 18, Issues 1-2; Jun. 2, 2018; 14 pages.
Pan, Feng et al., "A New Hybrid Model for Time-series Prediction," 2009 8th IEEE International Conference on Cognitive Informatics, Hong Kong China, pp. 281-286.

\* cited by examiner

METHODS AND SYSTEMS TO EXTRACT SIGNALS FROM LARGE AND IMPERFECT DATASETS

CROSS-REFERENCE TO RELATED APPLICATIONS

This application is a continuation of U.S. patent application Ser. No. 13/677,276, filed Nov. 14, 2012, now issued on Mar. 7, 2023 as U.S. Pat. No. 11,599,892, entitled "METHODS AND SYSTEMS TO EXTRACT SIGNALS FROM LARGE AND IMPERFECT DATASETS," and claims the benefit of U.S. Provisional Patent Application No. 61/629,227, filed Nov. 14, 2011, entitled "METHODS AND SYSTEMS TO CREATE SYNTHETIC VARIABLES, INDICATORS AND INDICES FROM MULTIPLE DATA AND METADATA SOURCES AND RISK MANAGEMENT CONTRACTS THEREON," which are hereby incorporated by reference herein in their entirety.

This application is also related to U.S. patent application Ser. No. 13/677,273, filed Nov. 14, 2012, now abandoned, entitled "METHODS AND SYSTEMS TO CREATE SYNTHETIC VARIABLES, INDICATORS, AND INDICES FROM MULTIPLE DATA AND METADATA SOURCES AND RISK MANAGEMENT CONTRACTS THEREON," U.S. patent application Ser. No. 13/677,277, filed Nov. 14, 2012, now abandoned, entitled "METHODS AND SYSTEMS TO QUANTIFY AND INDEX LIQUIDITY RISK IN FINANCIAL MARKETS AND RISK MANAGEMENT CONTRACTS THEREON," U.S. patent application Ser. No. 13/677,278, filed Nov. 14, 2012, now abandoned, entitled "METHODS AND SYSTEMS TO QUANTIFY AND INDEX CORRELATION RISK IN FINANCIAL MARKETS AND RISK MANAGEMENT CONTRACTS THEREON," and U.S. patent application Ser. No. 13/677,297, filed Nov. 14, 2012, now issued on Feb. 21, 2023 as U.S. Pat. No. 11,587,172, entitled "METHODS AND SYSTEMS TO QUANTIFY AND INDEX SENTIMENT RISK IN FINANCIAL MARKETS AND RISK MANAGEMENT CONTRACTS THEREON," all of which were filed on even date herewith and incorporated by reference herein in their entireties.

TECHNICAL FIELD

The present disclosure relates to extracting signals from large and imperfect datasets of economic and financial information or other data, including advertising and in particular targeted advertising, noisy communication systems, political decision making, and biotech and drug development, to obtain singular and composite factors for use in forecasting and predictive modeling.

BACKGROUND

Traditional economic and financial analysis relies upon data that are subject to reporting lags, revisions and different arrival times. In the case of economic statistics, such as, for example, rates of inflation or unemployment, market participants must wait until the data are collected, analyzed, and reported by an official governmental or other statistical agency in order to know and use this data. Even once disseminated, such data is often published with substantial delays and in a staggered fashion. Similarly, in the case of company financial data, market participants must wait until the given company reports its quarterly or yearly earnings. Market participants often rely on surveys and opinion polls to gauge expectations of future economic and financial conditions. However, these surveys and opinion polls are also subject to substantial reporting lags and staggered arrivals, and any individual survey or opinion poll may contain biases.

Economic and financial data in particular have certain characteristics which make it problematic to use some well-known statistical methods that can easily be applied in other disciplines. There are three main problems unique to economic and financial data. They are: 1) the revision problem; 2) publication lag problem; and 3) the spontaneous arrival problem. In particular, when working with large heterogeneous collections of time series data, traditional signal extraction methods such as Principal Components Analysis can induce a look-ahead bias if not modified to accommodate the idiosyncratic nature of economic and financial data. In addition, traditional PCA is performed on a standard correlation or covariance matrix, which by definition, must be square. If the data are incomplete or unbalance, the matrix operations may fail.

One key rule in economic analysis is to never throw away any information. It is crucial to keep the Information Set in tact when designing predictive models. However, this becomes problematic when dealing with historical time series data because data such as official government releases of economic statistics are revised, and as such there can be multiple vintages for the same observation period. In addition, the staggered arrival times of data cause a "jagged edge" in the dataset and pose practical difficulties when performing matrix operations. The most common solution is to trim the jagged edge, i.e., to discard the most recent data, but this is a violation of the key rule regarding the Information Set.

One solution is to create a modified hybrid signal extraction algorithm to accommodate the imperfections and idiosyncrasies that plague economic and financial data. Modern computing methods allow for rapid processing of large and imperfect datasets such that revisions, publication lags, missing data points, and spontaneous arrivals of data can be handled with relative ease.

SUMMARY

In accordance with some embodiments, a variety of signal extractors are employed to construct composite indicators or synthetic data proxy variables or factors from one or more data sources with specialized data handling options to resolve problems associated with economic and financial data: revisions, missing observations, publication lags, and spontaneous arrival. A forecast evaluation module aids in the selection of the signal extraction procedure that has produced the most accurate factor.

In accordance with some embodiments, a method for determining signals relating to economic conditions is provided, the method comprising: retrieving data from a plurality of data sources; concurrently executing a plurality of signal extractors on the retrieved data to extract economic factors from each of the plurality of data sources, wherein the retrieved data is organized for extracting the plurality of economic factors based on an executed signal extractor; generating a correlation (covariance) matrix of the underlying data, wherein the correlation (covariance) matrix is represented by eigenvalues and eigenvectors; performing a recursive eigendecomposition on the correlation (covariance) matrix to determine a time series of eigenvector weights; and generating a composite indicator of the retrieved data by applying the first and/or nth eigenvector weights to each of the plurality of data sources.

In accordance with some embodiments, a system for determining signals relating to economic conditions is provided, the system comprising a hardware processor that is configured to: retrieve data from a plurality of data sources; concurrently execute a plurality of signal extractors on the retrieved data to extract economic factors from each of the plurality of data sources, wherein the retrieved data is organized for extracting the plurality of economic factors based on an executed signal extractor; generate a correlation (covariance) matrix including the underlying data, wherein the correlation (covariance) matrix is represented by eigenvalues and eigenvectors; perform a recursive eigendecomposition on the correlation (covariance) matrix to determine a time series of eigenvector weights; and generate a composite indicator of the retrieved data by applying the eigenvector weights to each of the plurality of data sources.

In accordance with some embodiments, a non-transitory computer-readable medium containing computer-executable instructions that, when executed by a processor, cause the processor to perform a method for determining signals relating to economic conditions or asset prices, is provided. The method comprising: retrieving data from a plurality of data sources; concurrently executing a plurality of signal extractors on the retrieved data to extract economic factors from each of the plurality of data sources, wherein the retrieved data is organized for extracting the plurality of economic factors based on an executed signal extractor; generating a correlation (covariance) matrix including the extracted economic factors, wherein the correlation (covariance) matrix is represented by eigenvalues and eigenvectors; performing a recursive eigendecomposition on the correlation matrix to determine a time series of eigenvector weights; and generating a composite indicator of the retrieved data by applying the eigenvector weights to each of the plurality of data sources.

In some embodiments, the method further comprises performing a rolling or recursive Principal Components Analysis (PCA) on a correlation or covariance matrix, or a matrix of pairwise correlations (covariance), to obtain a time series of eigenvector loadings that serve as weights for creating a composite measure.

In some embodiments, the method further comprises filling in missing observations with Autoregressive Integrated Moving Average (ARIMA), arithmetic, logarithmic interpolation or extrapolation, Kalman filter, or some other method like taking mean, median, or mode measures, user-defined values, moving average values, or some other way to estimate missing data.

In some embodiments, the method further comprises automatically checking the shape of the dataset.

In some embodiments, the method further comprises providing a variety of data handling options to resolve the unique problems associated with economic and financial data: revisions, publication lags, missing observations, and spontaneous arrivals.

In some embodiments, the method further comprises using a variety of signal extraction methods to produce multiple candidate factors and then evaluating these factors with econometric techniques to find the most accurate one (with the lowest error).

In some embodiments, the method further comprises using a variety of forecast error measurement options (mean error, mean absolute error, mean absolute percent error, minimum variance, etc.).

In some embodiments, the method further comprises performing a rolling or recursive Principal Components Analysis (PCA) on a correlation or covariance matrix, or a matrix of pairwise correlations or covariances, and having contingency procedures in place in case the unbalanced dataset causes an error during signal extraction, with a series of alternative automatic fixes.

In some embodiments, a method for extracting signals using a Modified Principal Components Analysis-Kalman Filter (MPCA-KF) is provided, the method comprising: obtaining data from multiple data sources; organizing data from left to right in chronological order, with the data series having the oldest start date on the leftmost column, and the data series having the newest start date on the rightmost column; defining a ramp-up period and designate the first n observations to the ramp-up window to obtain initial values; calculating any of a standard correlation or covariance matrix, or a matrix of pairwise correlations or covariances; performing a recursive eigendecomposition at each period beginning at time t, and continuing at each successive period (t+1, t+2, t+3, etc.); allowing data to enter dynamically and on-the-fly by automatically detecting which data series are in the Information Set at any given time t, and at every successive period t+1; optionally allowing any revision data to either replace the revised data or enter the calculation concurrently; alternatively, a revision difference series can be calculated to measure the difference between the newly revised value and the originally published value; performing calculation on either a matrix of pairwise correlations or covariances or on the square correlation or covariance matrix, thus allowing the calculation to be performed on imperfect datasets if necessary; optionally automatically balancing an unbalanced panel by filling missing observations by estimating the values by ARIMA, arithmetic, or logarithmic interpolation or extrapolation or some other method; and incorporating the tattered edges of newly arrived data at the end of the sample caused by spontaneous arrival of data by either: (i) applying a Kalman Filter, or (ii) by ARIMA (Autoregressive Integrated Moving Average), or (iii) arithmetic or logarithmic extrapolation or some other method, estimating series to fill in tattered edges.

In some embodiments, the method further comprises calculating the moments of data series, wherein such calculations determine the statistical properties of the data, comprising one or more of the: (i) mean, (ii) median, (iii) mode, (iv) variance, (v) standard deviation, (vi) kurtosis, or (vii) skewness, and using these as elements of the metric.

In some embodiments, the method further comprises calculating the statistical relationships between data items, comprising one or more of (i) correlation, (ii) cointegration, or (iii) covariance. and using these as elements of the metric.

In some embodiments, a method of comparing signal extraction algorithms to identify a method which results in the lowest forecast error or lowest forecast variance is provided, the method comprising: selecting data from multiple data sources, from which to extract a common signal; organizing the data as required for each type of signal extraction algorithm; running various signal extraction algorithms simultaneously, including at least two of rolling or recursive Principal Components Analysis, Kalman Filter, or MPCA-KF, or some other signal extraction algorithm; obtaining signal series;
using signal series as explanatory variable in a regression model, with economic or financial data as dependent variable; obtaining parameter estimates; using parameter estimates to produce out of sample forecasts; measuring forecast errors; and selecting signal extraction algorithm which produces the factor or synthetic data proxy variable with at least one of lowest forecast error or lowest forecast variance.

In some embodiments, the method further comprises allowing data weights in factor to be user-define or arbitrarily obtained or obtained using optimization or alternate signal extraction methods.

In some embodiments, a method of extracting common signals from mixed frequency data is provided, the method comprising: obtaining data from multiple data sources wherein data are of mixed frequencies; applying signal extraction algorithm to obtain signal series; or converting lower frequency data to higher frequency by using ARIMA or logarithmic or arithmetic interpolation or extrapolation or some alternate method to estimate the series, and apply signal extraction algorithm to obtain signal series; or converting higher frequency data to lower frequency by taking arithmetic averages or some other calculation, and applying signal extraction algorithm to obtain signal series; comparing resulting signal series and select method and algorithm which results in lowest forecast error or lowest forecast variance.

In some embodiments, the signal extraction algorithm is one of standard, rolling or recursive PCA, Kalman Filter, or MPCA-KF, or some other signal extraction algorithm.

In some embodiments, the method further comprises displaying the information to a user in a graphical user interface (GUI) with a wizard for data handling options and statistical and econometric analysis module to test factors.

DETAILED DESCRIPTION

Figure 1:
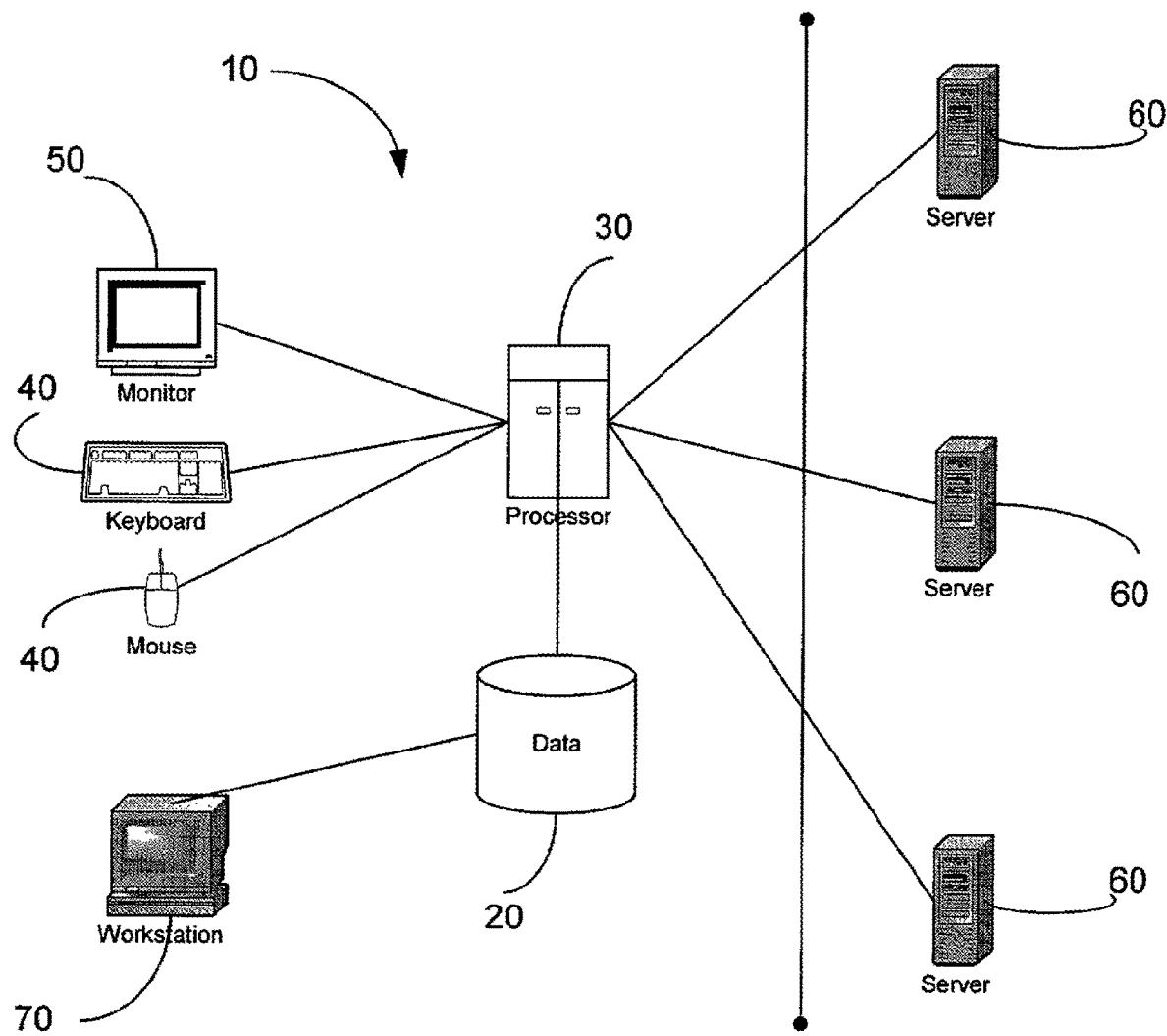
FIG. 1 illustrates an example network environment in which various exemplary embodiments of the present disclosure can operate.

A modified Principal Components Analysis-Kalman Filtering data processing and signal extraction procedure is presented which can accommodate the imperfections and idiosyncrasies which plague economic and financial data.
A. Overview
In exemplary embodiments of the present disclosure, systems and methods for extracting a common signal from large and imperfect datasets are presented. The resulting output is known as a "factor", "synthetic data proxy variable", "proxy variables", "composite factors", "latent factors", "indicators", "indices", and similar terminology. Multiple synthetic data proxy variables can be used in a multivariate expression of an indicator or index as well. The procedure can be applied to data or metadata, which can include either structural metadata which involves the design and specification of data structures, i.e., data about containers of data, as well as descriptive metadata which involves individual instances of application data, i.e., data about data contents ("metacontent").

The term "data" as used herein also includes (i) the moments of the statistical distribution of the data, such as, for example, the mean, standard deviation, variance, kurtosis, and skewness; (ii) statistical measures of the data, such as the median and mode; (iii) transformations such as, for example, arithmetic or logarithmic; or (iv) properties of the data over time, such as, for example, a moving average. It is also understood that the term "data" further includes various statistical relationships amongst the various sources of data, such as, for example, correlations, cointegrations, and covariances.

Exemplary embodiments of the present disclosure apply to extraction of a common signal or element from several disparate data sources, in order to derive a common factor, synthetic data proxy variable, proxy variable, composite indicator, index and the like. In exemplary embodiments of the present disclosure, when more than one data source is used to construct a factor, each data source can be assigned a weight, where the weights collectively sum to a fixed number. Such weights, which can each have, for example, a value between −1 and 1 inclusively, can either be arbitrarily determined, or can, for example, be determined by a mathematical formula, statistical method, or automatically determined by a signal extraction algorithm. This allows for the creation of a synthetic data proxy variable or composite factor by identifying the common element or signal to be discovered from a group of disparate data. An example of such a procedure to extract a common factor is described.

In exemplary embodiments of the present disclosure an exemplary indicator can be tested against historical data of outcomes in order to verify the accuracy and validity of the signal or common factor that was extracted. Such analysis can be conducted by means of (i) a simple statistical analysis, such as correlation or covariance, or by (ii) an econometric model such as Ordinary Least Squares, specified by (y=a+bx+e) whereby the factor would obtain associated parameter estimates, such as Alpha (a, a constant), Beta (b, the covariance between x and y divided by the variance of x), the Error (e), sigma (the standard deviation of x) and sigma-squared (the variance of x). Other methods to estimate an econometric model can include, for example, Generalized Method of Moments, Maximum Likelihood Estimate, etc. A factor can be modeled either linearly or non-linearly. It is recognized that in several instances the data may be of different sampling frequencies, so that either the data must be converted to the same frequency, or a technique for modeling mixed frequency data must be employed such as, for example, a MIDAS (Mixed Data Sampling) regression.

In exemplary embodiments of the present disclosure indicators can be made available on a platform which allows users to (i) specify data inputs for creating custom indicators, (ii) apply one or more mathematical formulas, statistical methods, or signal extraction algorithms to calculate the indicator, (iii) test the candidate indicators against actual outcomes and historical data, and (iv) make forecasts of future values of some quantity, such as economic data or asset prices. The factors or indicators can be displayed numerically, or in graphical form, and can, for example, be compared to one another, displayed in real-time or as time series historical data, and/or compared to historical outcome data. In exemplary embodiments of the present disclosure such factors or indicators can be used to estimate current and/or forecast future outcomes and predict future values of various economic or financial conditions, quantities, or states, or asset prices.

In exemplary embodiments of the present disclosure, where multiple data sources are combined to construct an indicator, the data sources can be combined into a composite indicator by assigning weights to each data source after the data have been appropriately processed and transformed. Such weights can be assigned either arbitrarily or by some means of optimization, such as, for example, by applying a signal extraction algorithm to find the common signal among the various data items. For example, a signal extraction algorithm such as Principal Components Analysis, the Kalman Filter, or the Wiener-Kolmogorov (WK) signal extraction formulae can be applied to discover the common element among the disparate sources of data. However, it is noted that standard signal extraction algorithms may be inadequate due to the nature of economic and financial data in particular, which may be subject to publication lags, spontaneous arrivals, revisions, or missing observations, and standard signal extraction methods may induce a look-ahead bias or fail in the case of missing or incomplete data. In this case, in exemplary embodiments of the present disclosure it is preferable to apply a modified hybrid signal extraction procedure to address the idiosyncrasies associated with this type of data. A Modified Principal Components/Kalman Filter (MPCA-KF) approach is next described which addresses the shortcomings of such standard signal extraction techniques. The described modified signal extraction algorithm captures the essence of a large dataset in a single series that assigns weights to each contributing data source. Such resulting series can then be used as (i) a synthetic data proxy variable, proxy variable, or latent factor representing some economic or financial condition or quantity which is not directly or immediately observable; (ii) an indicator for making an estimate or a forecast; (iii) a factor in a statistical model; or (iv) as a composite index measuring some quantity, such as a risk factor, which changes in value as the underlying data change in value (e.g., in real-time).

Principal components analysis is a technique used to reduce multidimensional datasets to lower dimensions for analysis. (See, e.g., Hotelling, H. (1933), "Analysis of a complex of statistical variables into principal components," Journal of Educational Psychology 24, 417-441,498-520, which is hereby incorporated by reference herein in its entirety.) PCA allows for a large set of correlated variables to be employed together, without the problem of multicollinearity, as the extracted factors are pairwise orthogonal. Sensitivity to units of measurement is avoided by standardizing the variables to have mean zero and unit variance, before calculating the principal components. Principal components of the indicators are formed by extracting the characteristic root of the standardized correlation or covariance matrix of the variables. That is, an eigenvalue decomposition, or an eigendecomposition, is performed. In the mathematical discipline of linear algebra, eigendecomposition, or sometimes spectral decomposition, is the factorization of a matrix into a canonical form, whereby the matrix is represented in terms of its eigenvalues and eigenvectors. Only diagonalizable matrices can be factorized in this way. The eigenvectors of a square matrix are the non-zero vectors that, after being multiplied by the matrix, either remain proportional to the original vector (i.e., change only in magnitude, not in direction) or become zero. For each eigenvector, the corresponding eigenvalue is the factor by which the eigenvector changes when multiplied by the matrix. The eigenvectors are sometimes also called characteristic vectors or latent vectors. Similarly, the eigenvalues are also known as characteristic values, characteristic roots or latent roots. The resulting eigenvector is a linear combination of the variables that allows for a common signal to be distilled from the data, thus measuring the collective impact of several indicators at once while conserving degrees of freedom. An eigenvalue tells us the proportion of total variability in a matrix associated with its corresponding eigenvector. Consequently, the eigenvector that corresponds to the highest eigenvalue tells us the dimension (axis) that generates the maximum amount of individual variability in the variables. The next eigenvector is a dimension perpendicular to the first that accounts for the second largest amount of variability, and so on. The eigenvector of the first principal component reveals the combination of variables that have the dominant impact in the overall system. The coefficient loadings of the eigenvector elements are also the correlation coefficients between the principal component and the underlying variables. It is the first principal component that will generally be taken as the synthetic data proxy variable, proxy variable, latent factor or composite indicator or index. However, such synthetic data proxy variable, proxy variable, latent factor or composite indicator or index is not limited to only the first principal component, as the second, third, and/or nth may also be utilized.

For ease of exposition, a brief explanation of eigenvalues and eigenvectors is next presented.

An important mathematical formulation is the characteristic equation of a square matrix. If C is an n by n covariance matrix, the characteristic equation is $$|C-\lambda I|=0$$

where $\lambda$ is a scalar. Solving this equation for $\lambda$ reveals that the equation is an nth degree polynomial of $\lambda$. That is, there are as many $\lambda$s as there are variables in the covariance matrix. The n $\lambda$s that are the roots of this polynomial are known as the eigenvalues of C. Because C is symmetric, all the $\lambda$s will be real numbers (i.e., not complex or imaginary numbers), although some of the $\lambda$s may be equal to or less than 0. The $\lambda$s can be solved for in any order, but it is customary to order them from largest to smallest.

To examine what is meant here, let C denote a two by two correlation matrix that has the form:

$$\begin{pmatrix} 1 & \rho \\ \rho & 1 \end{pmatrix}$$

the quantity $C-\lambda I$ may thus be written as:

$$C-\lambda I = \begin{pmatrix} 1 & \rho \\ \rho & 1 \end{pmatrix} - \begin{pmatrix} \lambda & 0 \\ 0 & \lambda \end{pmatrix} = \begin{pmatrix} 1-\lambda & \rho \\ \rho & 1-\lambda \end{pmatrix}$$

and the determinant is $$|C-\lambda I|=(1-\lambda)^2-\rho^2$$

So the equation that requires solution is $$(1-\lambda)^2-\rho^2=0$$

which is a quadratic in $\lambda$ (if we had three variables it would be cubic, and if we had four variables it would be quartic, etc.). Solving the quadratic gives $$\lambda=1\pm\rho$$

The largest root depends on the sign of P.
For: p>0,
Then $\lambda_1=1+P$ and $\lambda_2=1-p$.
For each $\lambda$ one can define a nonzero vector a such that $$(C-\lambda I)a=0$$

The 0 to the right of the equals sign denotes a vector filled with 0s. Any number in a that satisfies this equation is called a latent vector or eigenvector of matrix C. Each eigenvector is associated with its own $\lambda$. It is noted that the solution to a is not unique, because if a is multiplied by any scalar, the above equation still holds. Thus, there is an infinite set of values for a, although each solution will be a scalar multiple of any other solution. It is customary to normalize the values of a by imposing the constraint that a' a=1. A latent vector subject to this constraint is called a normalized latent vector. Taking the two by two correlation matrix with p>0, then $$(C-\lambda I)a = \begin{pmatrix} 1-\lambda & \rho \\ \rho & 1-\lambda \end{pmatrix}\begin{pmatrix} a_1 \\ a_2 \end{pmatrix} = \begin{pmatrix} (1-\lambda)a_1 + \rho a_2 \\ (1-\lambda)a_2 + \rho a_1 \end{pmatrix} = \begin{pmatrix} 0 \\ 0 \end{pmatrix}$$

or, by carrying out the multiplication, we find $(1-\lambda)a_1 + \rho a2 = 0$ $(1-\lambda)a_2 + \rho a1 = 0$ Now taking the largest eigenvalue, $\lambda=1+p$ and substituting gives $p(a_2-a_{11})=0$ $p(a_1-a_2)=0$ Thus, all we know is that $a_1=a_2$. If we let $a_1=10$, then $a_2=10$; and if we let $a_1=-0.023$, then $a_2=-0.023$. This is what was meant above when it was said that there were an infinite number of solutions where any single solution is a scalar multiple of any other solution. By requiring that a'a=1, we can settle on values of $a_1$ and $a_2$. That is, if $a_1^2+a_2^2=1$ and $a_1=a_2=a$, then $2a^2=1$ and $a=\sqrt{.5}$.

So the first eigenvector will be a 2 by 1 column vector with both elements equaling $\sqrt{.5}$. For the second eigenvector, we substitute 1−p for λ. This gives, $p(a_1+a_2)=0$ Consequently, $a_1=-a_2$. One of the a's must equal $\sqrt{.5}$ and the other must equal $-\sqrt{.5}$. It is immaterial which is positive and which is negative, but it is a frequent convention to make the first one ($a_1$) positive and the second one ($a_2$) negative. It is noted that the normalized eigenvectors of a two by two correlation matrix will always take on these values. The actual value of the correlation coefficient is irrelevant as long as it exceeds 0.

The Kalman (Kalman-Bucy) filter is a recursive algorithm for sequentially updating the one-step ahead estimate of the state mean and variance given new information. (Kalman, R. E., "A new approach to linear filtering and prediction problems," Journal of Basic Engineering 82 (1): 35-45 (1960) and Kalman, R. E. and Bucy, R. S., "New Results in Linear Filtering and Prediction Theory," (1961), which are hereby incorporated by reference herein in their entireties). The Kalman filter is a recursive estimator. This means that only the estimated state from the previous time step and the current measurement are needed to compute the estimate for the current state. In contrast to batch estimation techniques, no history of observations and/or estimates is required. Given initial values for the state mean and covariance, values for the system matrices Et, and observations on $y_t$, a Kalman filter may be used to compute one-step ahead estimates of the state and the associated mean-square error matrix, the contemporaneous or filtered state mean and variance, and the one-step ahead prediction, prediction error, and prediction error variance. The Kalman Filter is used extensively in the physical sciences, with applications in weather forecasting, satellite navigation systems, radar tracking, and seismology. Applications in the field of economics and other social sciences are nascent.

In order to use the Kalman filter to estimate the internal state of a process given only a sequence of noisy observations, the process must be modeled as follows. Specify matrices: $F_k$ the state-transition model; $H_k$ the observation model; $Q_k$ the covariance of the process noise; $R_k$ the covariance of the observation noise; $B_k$ the control-input model for each time-step k. The Kalman filter model assumes the true state at time k is evolved from the state at (k−1) according to:

$x_k = F_k x_{k-1} + B_k u_k + w_k$ where $F_k$ is the state transition model which is applied to the previous state $x_{k-1}$; $B_k$ is the control-input model which is applied to the control vector $u_k$; $w_k$ is the process noise which is assumed to be drawn from a zero mean multivariate normal distribution with covariance $Q_k$.

$W_k \sim N(0, Q_k)$

At time k, an observation or measurement $z_k$ of the true state $x_k$ is made whereby $z_k = H_k x_k + v_k$ where $H_k$ is the observation model which maps the true state space into the observation space and $v_k$ is the observation noise which is assumed to be zero mean Gaussian white noise with covariance $R_k$ $V_k \sim N(0, R_k)$ The initial state and the noise vectors at each step $\{x_0, w_1, \ldots, w_k, v_1, \ldots, v_k\}$ are all assumed to be mutually independent. (See Hamilton, J. (1994), Time Series Analysis, Princeton University Press. Chapter 13, 'The Kalman Filter', which is incorporated by reference herein in its entirety.)

In exemplary embodiments of the present disclosure an exemplary MPCA-KF algorithm differs from conventional Principal Components Analysis (PCA) in several aspects. First, it is calculated recursively, thus eliminating the look-ahead bias inherent in PCA. Second, dynamic on-the-fly programming allows seamless incorporation of new, discontinued, or revised data series, thus resolving the revision issue that plagues economic and financial data. Third, it can be performed on a matrix of pairwise correlations or covariances (in addition to the standard correlation or covariance matrix), thus allowing the calculation to be performed on imperfect datasets. Fourth, if a balanced panel is desired, missing observations can be filled in by estimating the values by ARIMA, arithmetic, or logarithmic interpolation or extrapolation, as is necessary. Fifth, tattered edges at the end of the sample caused by spontaneous arrival of new data can be smoothed by either: (i) applying a Kalman Filter or (ii) by ARIMA (Autoregressive Integrated Moving Average) or arithmetic or logarithmic extrapolation (estimating series to fill in tattered edges), thus resolving the spontaneous arrival problem associated with economic and financial data, and eliminating the need to discard valuable data observations.

It is noted that there exists the possibility that an eigendecomposition on a matrix of pairwise correlations or covariances (as opposed to the standard PCA method which is an eigendecomposition of a standard correlation or covariance matrix) may result in a matrix that not positive semidefinite, and the eigendecomposition cannot be performed. In this context it is recalled that a positive semidefinite matrix is a Hermitian matrix all of whose eigenvalues are nonnegative. A square matrix is called Hermitian if it is self-adjoint.

A self-adjoint matrix is a matrix A for which $A^H = \overline{A}^T = A$, where the conjugate transpose is denoted $A^H$, the transpose is $A^T$, and the complex conjugate is $\overline{Z}$. If a matrix is self-adjoint, it is said to be Hermitian. That is, it is noted that the properties of a matrix of pairwise correlations (covariances) are not quite the same as those of a standard correlation (covariance) matrix. In the case that the matrix of pairwise correlations (covariances) is not positive semidefinite, then either 1) the data matrix is forced to become balanced or squared by filling in the missing values by estimation using ARIMA, arithmetic, or logarithmic interpolation or extrapolation; or 2) a Kalman filter is applied over the entire unbalanced dataset.

In exemplary embodiments of the present disclosure such calculation can be performed continually by automatically checking and detecting the shape of the matrix. If spontaneously arrived data have caused a tattered edge at the end of the dataset, then the data can be filled in with estimates, either by ARIMA or arithmetic or logarithmic extrapolation or some other method, or the Kalman Filter can be applied. Once actual data have arrived, the estimated data can be replaced by the actual values. As long as the edge remains tattered, estimates are calculated to square the tattered edge. Once actual data arrive, they can replace the estimates to complete the tattered edge, and the calculation switches back to recursive principal components analysis, and the eigendecomposition is performed once again. When new data arrives to cause a new tattered edge in the next time period, the estimation procedure is resumed until the edge becomes square again then the estimates are replaced with actual data, and so on, repeating as each new data point arrives causing the tattered edge.

In exemplary embodiments of the present disclosure a calculation can be performed as follows. An initial ramp-up period can be designated, such as, for example, the first 20 observation time periods, whereby initial values are calculated using standard Principal Components Analysis (PCA). In the case that an observation is missing at any time period between time t=1 and t=20, the missing data can be estimated by ARIMA interpolation, or, for example, arithmetic or logarithmic interpolation (or the panel can be left unbalanced and the calculation can be attempted on an unbalanced matrix). Then, at each successive time period after t=20, the principal components can be estimated recursively, adding a set of n observations at each successive time t. That is to say, at each point in time, an eigenvalue decomposition is performed on the correlation or covariance matrix, or attempted on the unbalanced matrix of pairwise correlations or covariances. Data enter the calculation dynamically via on-the-fly programming. That is, at each point in time the program automatically detects which data series are available and performs the calculation on that dataset. If the calculation cannot be performed on the unbalanced panel using a matrix of pairwise correlations or covariances, missing data are automatically estimated and the panel becomes balanced. That is, the calculation is performed at each point in time using all of the data that is currently in or estimated to be in the Information Set. If a series has been discontinued or introduced in a given time period, the Information Set reflects that change. If a data series has been revised in a given time period, then the revision enters the Information Set at that point in time. The unrevised data can remain in the information set or a user can instruct the program to replace the unrevised value with the revised value, or to include the calculated revision difference series. In the case that a series has been revised, the newly revised value can be substituted for the previous value, or the unrevised and revised values can enter the calculation concurrently as different series. The key is that the program can automatically detect what is in the Information Set at each point in time and the calculation is performed at each point in time, so as to avoid the look-ahead bias that is inherent in standard PCA. In the case newly arrived data causes a tattered edge at time t, either (i) the data can be estimated by ARIMA or arithmetic or logarithmic extrapolation to complete the square matrix, or (ii) a Kalman Filter is applied. Instead of being performed only on a square matrix and discarding newly arrived or revised data, the calculation can performed on the entire dataset including the tattered edge, i.e., on an unbalanced matrix of pairwise correlations or covariances. Alternatively, data are estimated to fill the tattered edge or a Kalman Filter is applied.

Thus, in exemplary embodiments of the present disclosure such an MPCA-KF algorithm can be applied to a standard correlation or covariance matrix, or to a matrix of pairwise correlations (covariances) from a data matrix with a tattered edge. This allows signal extraction from imperfect datasets, eliminating the need to trim to a square matrix and discard valuable data. As noted, at the final tattered edge of newly arrived data, either (i) the missing data are filled in by ARIMA, arithmetic, or logarithmic extrapolation; or (ii) a Kalman Filter can be applied.

Alternatively, in exemplary embodiments of the present disclosure, a two-step approach can be employed whereby first the tattered edge of newly arrived data can be truncated to form a square matrix. The modified principal components can be estimated at each point in time recursively and dynamically on either a standard correlation or covariance matrix or a matrix of pairwise correlations or covariances. Then, a Kalman Filter can be employed over the entire dataset including the final tattered edge of newly arrived data, and the data computation repeated. This two-step procedure may be performed in a recursive fashion. This technique addresses the general problem of performing an analysis in real time, such as analyzing an economy, where a forecast must be conducted on the basis of datasets that, due to different arrival times, caused for example, by publication lags, result in a tattered edge, i.e., an unbalanced panel, at the end of the sample period.

Thus, the method described above allows for the calculation of a signal in real-time in exemplary embodiments of the present disclosure. The method can correct the look-ahead bias that is inherent in standard PCA by performing the calculation recursively at each point in time. The method can correct the revision problem associated with official economic statistics that are subject to publication revisions because the data enter the calculation dynamically and on the fly. The method can also correct for missing data points by estimating values with ARIMA, arithmetic, or logarithmic interpolation or extrapolation. The method can correct for the spontaneous arrival problem associated with publication lags of official economic data releases or corporate earnings, or time zone issues in financial markets, such as the market for foreign exchange where markets close and open at different times around the world.

In exemplary embodiments of the present disclosure an example system can offer as a choice several well-known signal extraction algorithms, the hybrid MPCA-KF algorithm described above, or some other hybrid or modified signal extraction method. All possible signal extraction methods can be applied concurrently in order to identify the method that results in the lowest forecast error. An example system can run several signal extraction algorithms simultaneously to generate candidate latent factors or synthetic data proxy variable. These candidate variables can then be tested concurrently in a statistical or econometric forecasting model. The example system can then automatically identify the candidate variable that produces the lowest forecast error, and recommend that factor as a suitable indicator to the user. The factor can then be used as an input in an econometric model to estimate some economic quantity or asset price, or, the factor can be treated as an indicator that is computed in real-time to represent some indexed quantity of interest. It is noted that in general the novel MPCA-KF algorithm described above is expected to result in the lowest forecast error because it eliminates the look-ahead bias, can be performed on an unbalanced sample, and allows for incorporation of newly arrived data with idiosyncratic arrival times that result in a tattered edge, thus eliminating the need to discard valuable data with staggered arrivals.

It is understood that such a factor can comprise some linear or non-linear combination of various data sources, and that some indicators can, for example, be formed using current as well as lagged values of the data, and that the lagged values may be used in some linear combination or in a nonlinear combination. In this manner, the data will "decide" which combination, whether linear or nonlinear, current or lagged, and which weights determine the best indicator, that is the indicator that results in the lowest forecast error.

B. Exemplary Network Environment

FIG. 1 illustrates an example environment in which exemplary embodiments of the present disclosure can be implemented. Relevant social media data and other data can, for example, be stored on a relational database 20 (as are well known and provided by, for example, IBM, Microsoft Corporation, Oracle and the like) associated with a computer system 10 provided with and running various computational hardware and software applications necessary to generate one or more indicators. Computer system 10 can include, for example, a microprocessor 30, which is understood to include various multiple core processors, various distributed processors, etc., memory (not shown), a storage medium (not shown), input devices (e.g., keyboard, mouse, microphone, etc.) 40, and one or more monitors 50. System 10 can, for example, be operated using a conventional operating system, and can include, for example, a graphical user interface for navigating and controlling various computational aspects of the present disclosure. System 10 can, for example, also be linked to one or more external data source servers 60 that feed system 10 with some or all of the necessary external data for computing the various indicators. Alternatively, as shown in FIG. 1, a stand-alone workstation 70, including a processor, memory, input devices and storage medium may be used to access database 20, or for example, a combination of database 20 and various external data source servers (not shown) akin to external data source servers 60.

Any suitable hardware and/or software can be used to perform the mechanisms described herein. For example, a general purpose device such as a computer or a special purpose device such as a client, a server, etc. can be used to execute software for performing the mechanisms described herein. Any of these general or special purpose devices can include any suitable components such as a hardware processor (which can be a microprocessor, digital signal processor, a controller, etc.), memory, communication interfaces, display controllers, input devices, etc. This hardware and/or software can be implemented as part of other equipment or can be implemented as stand-alone equipment (which can be coupled to other equipment).

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

C. Exemplary Operation

Figure 2A:
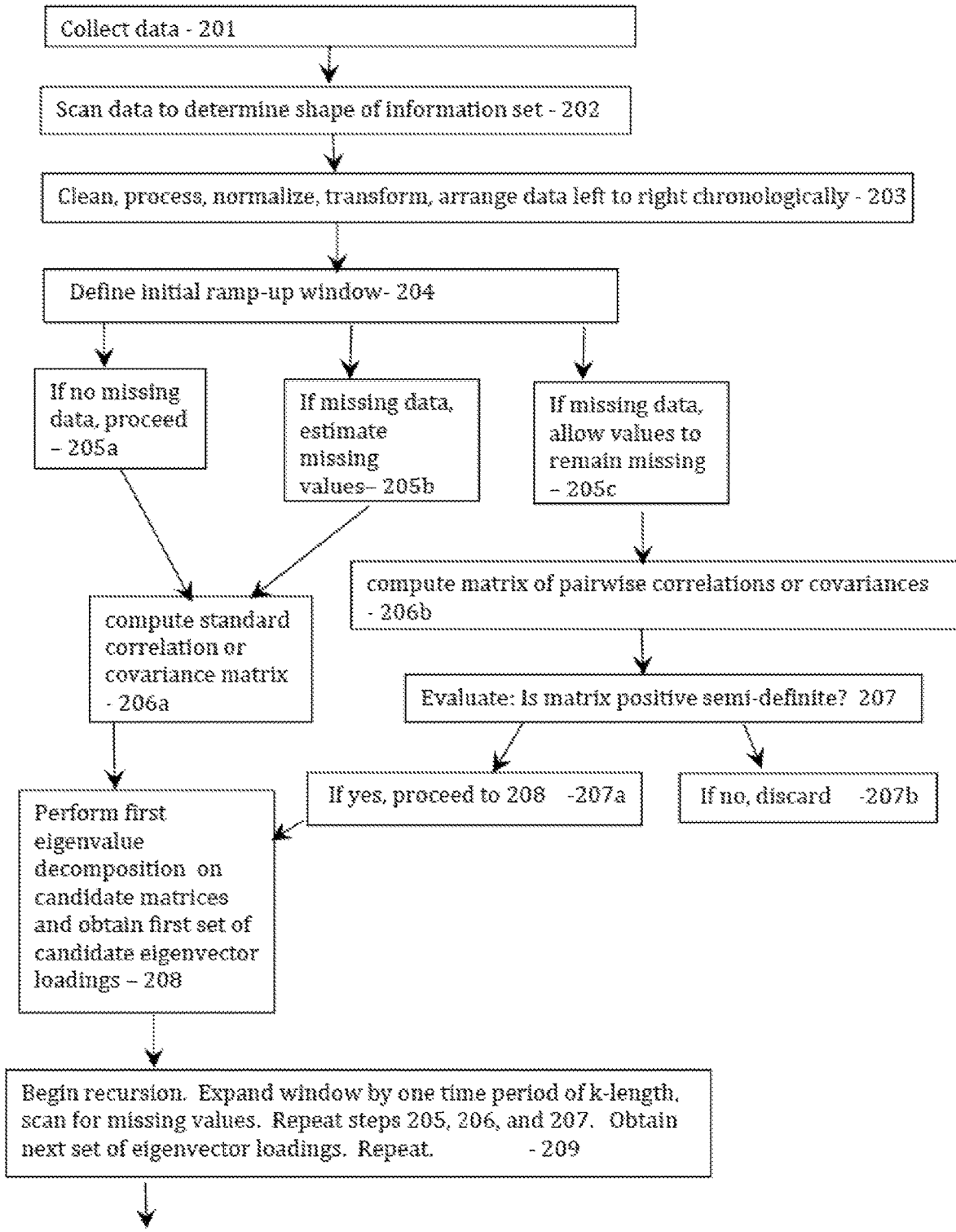
FIGS. 2A and 2B are schematic diagrams that illustrates the procedure for collecting data, creating a synthetic data proxy variable or indicator, and making a forecast.
Figure 2B:
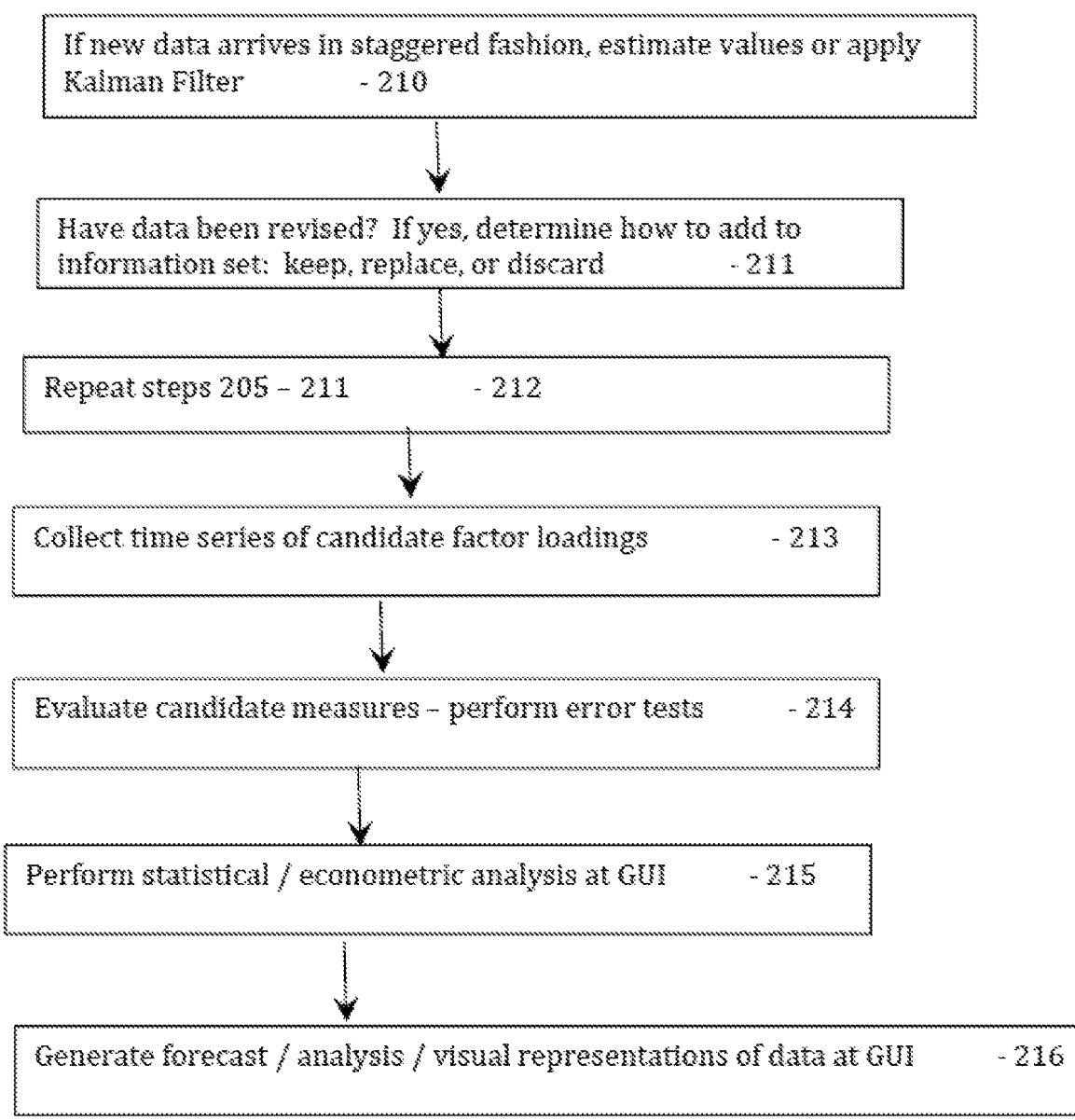

After the data is collected, it must first be processed before it can be employed in an exemplary analysis. The processing step can include any or all of the following steps: collect data 201; scan and determine shape of information set 202; process, normalize, transform, and arrange data 203; define ramp-up window 204; determine whether or not there is missing data 205*a*, 205*b*, 205*c*; compute correlation/covariance matrices 206*a*, 206*b*; evaluate matrices 207*a*, 207*b*; perform eigenvalue decomposition 208; begin recursion 209; new data arrives—if staggered, estimate values or apply Kalman Filter 210; new data arrives—if revisions, keep, replace, or discard 211; repeat steps 205-211 at step 212; collect time series of candidate factor loadings 213; evaluate and perform error tests on candidate measures 214; perform further statistical/econometric analysis at GUI 215. (See FIGS. 2A and 2B)

In exemplary embodiments of the present disclosure, once an indicator has been created it can be used, for example, to analyze and/or forecast the economic or financial quantity of interest, by employing statistical analysis to determine the relationship between the indicator and (i) other indicators; (ii) historical data related to the economic or financial quantity of interest. Such statistical analysis, at 215, such as, for example, Ordinary Least Squares, which takes the form of y=a+bx+e, generates parameter estimates such as beta, of the relationship of the indicator with the dependent variable in the analysis over a certain sample period. These parameter estimates can then be applied, for example, to a post-sample period to produce, at 216, by means of an econometric model, an estimate of current and/or a forecast of future economic conditions or financial quantities of interest. At 216 a Graphical User Interface (GUI) allows a visual representation of steps 201-215 to a user comprising charts, graphs, and other user-configurable visual representations of the data in order to determine, for example, relationships between data and trends over time.

For example, a graph can represent the behavior of the extracted factor over time. It is understood that such graphical depiction may also include one or more of the following:
(i) calculating and displaying how the factor trends over time;
(ii) calculating and displaying how the factor varies by data source,
(iii) calculating and displaying how the factor concurrently trends over time and varies by different data sources;
(iv) calculating and displaying which data elements exert the most influence on the factor;
(v) calculating alternative factors; and
(vi) comparing the performance of factors obtained with alternate signal extraction procedures.

It is also understood that exemplary graphical display may be accompanied by or include the capacity to generate real-time visual (lights changing colors), graphical, numerical, or textual (email, sms, Tweets), alerts regarding the behavior of the factor in real time and implications or forecasts for current or future economic or financial conditions, quantities or states, or asset prices.

It is also understood that such a system utilizes a graphical user interface comprising a unique combination of (i) data mining capabilities, (ii) statistical and econometric analysis and (iii) graphical reporting tools to identify a data source or combination of sources that has greatest predictive power of current and future economic or financial conditions, quantities or states, or asset prices. It is understood that such a system may further comprise a graphical user interface that allows a user to configure parameters, such as a wizard which prompts the user to set parameters by which the system calculates, delivers, and displays the factors.

To further concretize the above discussion, an example is next described. The example illustrates exemplary uses of various exemplary embodiments of the present disclosure.

Example 1—Sentiment Risk Indicator and Method of Hedging Sentiment Risk

An indicator of sentiment, psychological, or emotion risk in the economy and financial markets can be created by forming a composite indicator of sentiment measures obtained from surveys, opinion polls, internet search query data and social media data. A signal extraction algorithm such as the one described above would be applied to changes in values of certain periodic surveys and opinion polls which measure public (businesses and households or consumers) sentiment regarding their particular economic circumstances and prospects, the circumstances and prospects for the economy in general, and their outlooks on financial markets and business conditions. Surveys such as the Institute for Supply Management Purchasing Managers' Index (ISM), The Philadelphia Federal Reserve Business Outlook Survey (PHIL), University of Michigan Index of Consumer Sentiment (ICS), Conference Board Consumer Confidence Index (CCI), and the Bloomberg consumer comfort index (BBG) are examples of surveys and opinion polls which contain sentiment and forward looking expectations measures. Similarly, a measure of public sentiment can be obtained from social media posts on services such as Twitter (TWIT). Similarly, a measure of public sentiment can be obtained from news headlines and articles by creating a news factor (NEWS). Since Twitter and News are real-time data sources, these sources would theoretically serve to update the overall sentiment index in between arrival times of survey and opinion poll data.

For Twitter, a sentiment score index could be calculated as follows.

Suppose measurements are taken at each time t to determine the ratio of negative words to total words found in Tweets related to the economy and financial markets. The change can be calculated by applying the log difference to period t+1 versus time t, that is, by calculating $\ln(X_{t+1}/X_t)$. Multiplying the change by 100 (a Multiplier) produces the TWIT sentiment score index.

| TWIT | Negative | Total | Ratio | Change | Index |
|---|---|---|---|---|---|
| t = 1 | 32486 | 45998 | 0.7062481 | | |
| t = 2 | 35132 | 56224 | 0.62485771 | −0.1224426 | −12.244263 |
| t = 3 | 42332 | 59887 | 0.70686459 | 0.12331516 | 12.3315164 |
| t = 4 | 40665 | 65231 | 0.62339992 | −0.1256509 | −12.565089 |

-continued

| TWIT | Negative | Total | Ratio | Change | Index |
|---|---|---|---|---|---|
| t = 5 | 39887 | 62991 | 0.63321744 | 0.01562564 | 1.56256417 |
| t = 6 | 41232 | 60865 | 0.67743366 | 0.06749776 | 6.74977598 |
| t = 7 | 32869 | 61543 | 0.53408186 | −0.2377625 | −23.776251 |
| t = 8 | 29663 | 58943 | 0.5032489 | −0.0594642 | −5.9464244 |
| t = 9 | 31987 | 57654 | 0.55480973 | 0.09754034 | 9.7540339 |
| t = 10 | 30443 | 61443 | 0.49546734 | −0.1131238 | −11.312377 |

For example, a sentiment measure from Twitter could be calculated, by determining the ratio of negative words to total words, related to topics such as the economy and financial markets. The TWIT sentiment score index would represent the percent change from period to period in the ratio of negative words to total words. A similar technique could be employed to construct a NEWS factor. Sentiment factors from TWIT, NEWS, and other real-time sources could theoretically be calculated to have any frequency from real-time, to hourly, to daily, weekly, monthly, etc. For ease of exposition, the following example considers a monthly factor.

It is also understood that in similar fashion, methods to create TWIT could produce a sentiment score from one or more of the following:
 (i) the fraction of negative words to total words,
 (ii) how many times each occurrence of the terms or phrases of interest appears in a social media conversation or Internet search query log,
 (iii) number of keywords expressing sentiment about the terms or phrases of interest in the set of keywords,
 (iv) whether each keyword reflects a positive, negative, or neutral sentiment about the subject matter of interest, and
 (v) relevance of the keywords expressing sentiment about the terms or phrases of interest.

It is also understood that such a sentiment metric may be obtained by harvesting data obtained from online content, wherein said harvesting includes using a conversation monitoring module to collect web content to generate a real-time database of social media and web conversations related to current or future economic or financial conditions, quantities or states, or asset prices, wherein said conversation monitoring module utilizes a crawler. Such a system for analyzing social media postings on the Internet, comprises a conversation monitoring module, said module having an associated crawler, wherein, in operation, said module generates a conversation index of social media related to current or future economic or financial conditions, quantities or states, or asset prices, wherein said current or future economic or financial conditions, quantities or states, or asset prices include earnings surprises, company earnings and stock prices, and further comprising using a social media analysis module to generate a sentiment or tone factor that measures at least one of positive words, negative words, and a ratio of negative to positive words or total words used in a conversation, wherein said social media includes blogs, wikis, online communities, and other social interaction platforms. Such a system further comprises using a social media analysis module that implements a scoring algorithm to determine which media source has the best track record in terms of predicting current or future economic or financial conditions, quantities or states, or asset prices or company earnings.

It is also noted that internet search query data may be utilized to create a real-time proxy for a given survey. For example, in the case of the University of Michigan Index of Consumer Sentiment, internet search queries performed on a search engine such as Google for information related to certain items such as durable goods can be used as a real-time proxy for the Michigan ICS questions regarding household expectations for purchasing durable goods in the near future.

A composite index can be formed by applying a signal extraction algorithm to identify the common element among the various sentiment measures. A weight $w_i$ can be determined for each of the data sources, and a composite index can be formed as follows:

$$SRI \text{ (Sentiment Risk Index)} = w_1 ISM + w_2 PHIL + w_3 ICS + w_4 CCI + w_5 BBG + w_6 TWIT + w_7 NEWS$$

Alternatively, $$\sum_{i=1}^{n} w_i P_i * M + S = SRI_{(Sentiment\ Risk\ Index)}$$

where $w_i$ are weights, $P_i$ are psychological or sentiment measures, M is a multiplier, and S is a scalar. It is understood that the multiplier M and scalar S may take on any value, including 1 and 0, respectively.

Example Calculation

Suppose, for example, we have the following data representing monthly changes (calculated by the log differences) in the values for ISM, PHIL, ICS, CCI, BBG, TWIT, and NEWS.

|  |  | ISM | PHIL | ICS | CCI | BBG | TWIT | NEWS |
|---|---|---|---|---|---|---|---|---|
| June 07 | t = 1 | 8.88 | 3.44 | 8.35 | −2.73 | −7.25 | −11.12 | 6.79 |
| July 07 | t = 2 | 9.76 | −5.64 | −5.07 | 6.05 | 4.09 | 12.10 | 10.66 |
| August 07 | t = 3 | −6.08 | −3.46 | −4.20 | −0.82 | 5.08 | −32.69 | −19.65 |
| September 07 | t = 4 | −11.47 | 0.18 | 0.92 | 2.60 | 6.72 | 12.95 | 3.53 |
| October 07 | t = 5 | 14.52 | −0.30 | −2.36 | −2.68 | −7.58 | −2.50 | 14.42 |
| November 07 | t = 6 | −1.01 | 2.46 | 5.29 | 3.95 | −2.43 | 5.82 | 7.03 |
| December 07 | t = 7 | 1.79 | 9.60 | 9.75 | −1.35 | 1.66 | 8.38 | 2.04 |
| January 08 | t = 8 | −2.95 | −8.89 | −11.90 | 2.77 | 6.83 | −32.77 | −6.96 |
| February 08 | t = 9 | −2.97 | −4.51 | 2.57 | 1.47 | 2.94 | 27.61 | −10.93 |
| March 08 | t = 10 | 7.26 | 0.92 | −4.84 | 0.15 | −2.22 | 9.07 | 5.76 |
| April 08 | t = 11 | −12.52 | 0.43 | −3.29 | −18.94 | −15.50 | −7.97 | −1.56 |
| May 08 | t = 12 | −8.27 | −2.40 | 2.71 | −10.44 | 5.31 | −4.85 | −33.02 |
| June 08 | t = 13 | −2.80 | −1.57 | −2.93 | 9.89 | −4.37 | 5.02 | 0.10 |
| July 08 | t = 14 | 3.74 | −1.02 | 1.48 | 6.32 | 6.14 | −17.49 | −7.89 |
| August 08 | t = 15 | −6.71 | 1.65 | 1.96 | −2.30 | −8.03 | 8.48 | 0.90 |
| September 08 | t = 16 | 8.15 | 3.58 | 0.86 | −2.17 | −0.53 | −9.49 | 1.77 |
| October 08 | t = 17 | −1.36 | −1.28 | −3.33 | 4.39 | 2.83 | 13.04 | 5.23 |
| November 08 | t = 18 | 2.11 | −1.11 | 2.76 | 3.44 | 5.53 | −14.88 | 3.27 |
| December 08 | t = 19 | 3.85 | 0.31 | 1.07 | −3.44 | −0.98 | −5.10 | 7.18 |
| January 09 | t = 20 | 18.45 | 4.89 | 2.80 | 3.86 | 5.01 | −5.60 | 14.45 |
| February 09 | t = 21 | −10.34 | −8.74 | −5.31 | −0.85 | −3.15 | −5.81 | 11.04 |
| March 09 | t = 22 | 10.74 | 1.72 | −1.02 | 3.10 | 10.05 | −17.43 | 0.29 |
| April 09 | t = 23 | 4.24 | −1.27 | 7.09 | 3.88 | 1.83 | 18.88 | 12.37 |
| May 09 | t = 24 | 4.74 | 2.96 | 3.03 | 1.57 | 1.96 | −5.69 | 4.32 |
| June 09 | t = 25 | −0.12 | −3.35 | −7.30 | −9.14 | −4.23 | 15.32 | 4.61 |
| July 09 | t = 26 | −8.78 | 4.58 | 0.64 | 1.19 | −6.37 | 15.93 | −2.97 |
| August 09 | t = 27 | 8.36 | 8.64 | 8.63 | 2.01 | 6.81 | −0.28 | 5.74 |
| September 09 | t = 28 | −1.36 | −12.33 | −2.84 | 5.24 | 2.17 | 6.34 | −3.30 |
| October 09 | t = 29 | 4.73 | 5.63 | 4.84 | −3.93 | 0.85 | −9.47 | 4.88 |
| November 09 | t = 30 | −0.24 | 4.47 | 1.90 | 1.78 | 5.30 | 2.48 | 0.22 |

Suppose the MPCA-KF algorithm described above is applied, and assuming for ease of exposition that the data items arrive simultaneously at each successive time period. The first 20 observations are utilized as a ramp-up period and a set of initial weights, summing to 1, are calculated at t=20 based on the correlation matrix, a standard correlation matrix with values bounded between −1 and 1. A standard correlation matrix is obtained for the 20-month period covering June 2007 to January 2009:

| Correlation Matrix June 2007–January 2009 | | | | | | | |
|---|---|---|---|---|---|---|---|
| | ISM | PHIL | ICS | CCI | BBG | TWIT | NEWS |
| ISM | 1 | 0.280055 | 0.125079 | 0.329044 | 0.046757 | −0.031162 | 0.610783 |
| PHIL | 0.280055 | 1 | 0.751053 | −0.169945 | −0.313332 | 0.20769 | 0.38833 |
| ICS | 0.125079 | 0.751053 | 1 | −0.089229 | −0.083228 | 0.281934 | 0.077864 |
| CCI | 0.329044 | −0.169945 | −0.089229 | 1 | 0.536445 | 0.150346 | 0.297538 |
| BBG | 0.046757 | −0.313332 | −0.083228 | 0.536445 | 1 | −0.138821 | −0.30494 |
| TWIT | −0.031162 | 0.20769 | 0.281934 | 0.150346 | −0.138821 | 1 | 0.28608 |
| NEWS | 0.610783 | 0.38833 | 0.077864 | 0.297538 | −0.30494 | 0.28608 | 1 |

An eigendecomposition can then be performed on the t=20 correlation matrix and the following weights can be thus obtained:

| Sentiment Risk Index Calculation | | | | | | | | | | | | | | |
|---|---|---|---|---|---|---|---|---|---|---|---|---|---|---|
| January 09 t = 20 | SRI | = | 0.39 | PHIL | 0.18 | ISM | 0.14 | BBG | 0.11 | TWIT | 0.09 | ICS | 0.07 NEWS | 0.02 CCI | which result in the following linear combination and calculation of the Sentiment Risk Index at t=20.

Sentiment Risk Index Calculation $$\text{Jan-09 } t=20 \text{ } SRI=(0.39*4.89)+(0.18*18.45)+ \\ (0.14*5.01)+(0.11*-5.60)+(0.09*2.80)+ \\ (0.07*14.45)+(0.02*3.86)=6.65355097$$

Sentiment Risk Index Calculation $$\text{Jan-09 } t=20 \text{ } SRI=6.65355097+ \\ 100=106.653551=\text{Sentiment Risk Index}$$

Next, at t=21, the calculation can be repeated. For ease of exposition, it is assumed that all data items arrive simultaneously at t=21 (i.e., there is no tattered edge). A new correlation matrix can thus be obtained at t=21, for the 21-month period covering June 2007 to February 2009.

| Correlation Matrix June 2007–February 2009 | | | | | | | |
|---|---|---|---|---|---|---|---|
| | ISM | PHIL | ICS | CCI | BBG | TWIT | NEWS |
| ISM | 1 | 0.368545 | 0.185727 | 0.323169 | 0.079517 | −0.013852 | 0.509614 |
| PHIL | 0.368545 | 1 | 0.760258 | −0.14017 | −0.228691 | 0.210349 | 0.252066 |
| ICS | 0.185727 | 0.760258 | 1 | −0.079567 | −0.051989 | 0.286316 | 0.02461 |
| CCI | 0.323169 | −0.14017 | −0.079567 | 1 | 0.535939 | 0.151677 | 0.28461 |
| BBG | 0.079517 | −0.228691 | −0.051989 | 0.535939 | 1 | −0.131162 | −0.321035 |
| TWIT | −0.013852 | 0.210349 | 0.286316 | 0.151677 | −0.131162 | 1 | 0.268098 |
| NEWS | 0.509614 | 0.252066 | 0.02461 | 0.28461 | −0.321035 | 0.268098 | 1 |

The eigendecomposition can again be performed on the t=21 correlation matrix and the following weights can thus be obtained:

| Sentiment Risk Index Calculation | | | | | | | | | | | | | | |
|---|---|---|---|---|---|---|---|---|---|---|---|---|---|---|
| January 09 | t = 20 | SRI = | 0.39 PHIL | 0.18 ISM | 0.14 BBG | 0.11 TWIT | 0.09 ICS | 0.07 NEWS | 0.02 CCI |
| February 09 | t = 21 | SRI = | 0.28 ISM | 0.21 ICS | 0.17 PHIL | 0.11 BBG | 0.09 CCI | 0.08 TWIT | 0.06 NEWS |

This results in the following linear combination and calculation of the Sentiment Risk Index at t=21.

Sentiment Risk Index Calculation

Jan-09 1=20 SRI=(039*4,89)+(0.18*18.45)+
(0.14*5.01)+(0.11*5,60)+(0.09*2.80)+(0.07*14,
45)+(0.02*3,86)=6.65355097

Feb-09 1=21 SRI=(0.28*−1034)+(0.21*−5.31)+
(0.17*8,74)+(0.11*3.15)+(0.09*−0,85)+(0.08*−
5.81)+(0.06*11.04)=−5.7222905

Sentiment Risk Index Calculation

Jan-09 t=20 SRI=6.65355097+
100=106.653551=Sentiment Risk Index

Feb-09 t=21 SRI=−5.7222905+
100=94.2777095=Sentiment Risk Index

The process can be continued, and thus at each successive time period t+n, a new row of observations can be added to the matrix (data items arrive simultaneously in this example), a new correlation matrix is determined, a new eigendecomposition performed, a new set of weights obtained, and a new value of the Sentiment Risk Index calculated. The procedure continues recursively, with a new set of weights obtained at each period until t=30. The weights determined at each time period sum to 1.

| Weights | | | | | | | | | |
|---|---|---|---|---|---|---|---|---|---|
| | | w1 | w2 | w3 | w4 | w5 | w6 | w7 | TOTAL |
| t= | 20 | 0.39 | 0.18 | 0.14 | 0.11 | 0.09 | 0.07 | 0.02 | =1 |
| t= | 21 | 0.28 | 0.21 | 0.17 | 0.11 | 0.09 | 0.08 | 0.06 | =1 |
| t= | 22 | 0.41 | 0.25 | 0.12 | 0.08 | 0.07 | 0.05 | 0.02 | =1 |
| t= | 23 | 0.37 | 0.22 | 0.16 | 0.14 | 0.07 | 0.03 | 0.01 | =1 |
| t= | 24 | 0.52 | 0.23 | 0.11 | 0.07 | 0.04 | 0.02 | 0.01 | =1 |
| t= | 25 | 0.49 | 0.26 | 0.14 | 0.05 | 0.03 | 0.02 | 0.01 | =1 |
| t= | 26 | 0.34 | 0.27 | 0.18 | 0.13 | 0.04 | 0.03 | 0.01 | =1 |
| t= | 27 | 0.28 | 0.24 | 0.21 | 0.18 | 0.06 | 0.02 | 0.01 | =1 |
| t= | 28 | 0.51 | 0.19 | 0.15 | 0.09 | 0.03 | 0.02 | 0.01 | =1 |
| t= | 29 | 0.48 | 0.21 | 0.14 | 0.08 | 0.04 | 0.03 | 0.02 | =1 |
| t= | 30 | 0.35 | 0.17 | 0.15 | 0.13 | 0.09 | 0.07 | 0.04 | =1 |

At each time period, a vector can be determined, that is, a linear combination of the data elements is determined by the signal extraction algorithm, whereby the algorithm determines which data element is exerting the most to the least influence on the system at that point in time.

| Sentiment Risk Index Calculation | | | | | | | | | | |
|---|---|---|---|---|---|---|---|---|---|---|
| January 09 | t = 20 | SRI = | 0.39 PHIL | 0.18 ISM | 0.14 BBG | 0.11 TWIT | 0.09 ICS | 0.07 NEWS | 0.02 CCI |
| February 09 | t = 21 | SRI = | 0.28 ISM | 0.21 ICS | 0.17 PHIL | 0.11 BBG | 0.09 CCI | 0.08 TWIT | 0.06 NEWS |
| March 09 | t = 22 | SRI = | 0.41 TWIT | 0.25 ICS | 0.12 ISM | 0.08 PHIL | 0.07 NEWS | 0.05 CCI | 0.02 BBG |
| April 09 | t = 23 | SRI = | 0.37 ICS | 0.22 NEWS | 0.16 CCI | 0.14 ISM | 0.07 TWIT | 0.03 BBG | 0.01 PHIL |
| May 09 | t = 24 | SRI = | 0.52 BBG | 0.23 PHIL | 0.11 CCI | 0.07 ICS | 0.04 ISM | 0.02 NEWS | 0.01 TWIT |
| June 09 | t = 25 | SRI = | 0.49 ISM | 0.26 PHIL | 0.14 ICS | 0.05 CCI | 0.03 BBG | 0.02 TWIT | 0.01 NEWS |
| July 09 | t = 26 | SRI = | 0.34 NEWS | 0.27 TWIT | 0.18 CCI | 0.13 BBG | 0.04 ICS | 0.03 PHIL | 0.01 ISM |
| August 09 | t = 27 | SRI = | 0.28 BBG | 0.24 NEWS | 0.21 PHIL | 0.18 CCI | 0.06 TWIT | 0.02 ISM | 0.01 ICS |
| September 09 | t = 28 | SRI = | 0.51 TWIT | 0.19 BBG | 0.15 NEWS | 0.09 PHIL | 0.03 ICS | 0.02 ISM | 0.01 CCI |
| October 09 | t = 29 | SRI = | 0.48 CCI | 0.21 ICS | 0.14 TWIT | 0.08 NEWS | 0.04 ISM | 0.03 PHIL | 0.02 BBG |
| November 09 | t = 30 | SRI = | 0.35 TWIT | 0.17 PHIL | 0.15 ICS | 0.13 CCI | 0.09 BBG | 0.07 ISM | 0.04 NEWS |

Substituting back in the values of the data matrix gives the following linear combination of weighted variables:

Sentiment Risk Index Calculation

Jan-09 t=20 SRI=(0.39*4.89)+(0.18*18.45)+
(0.14*5.01)+(0.11*5.60)+(0.09*2.80)+
(0.07*14.45)+(0.02*3.86)=6.65355097

Feb-09 t=21 SRI=(0.28*10.34)+(0.21*5.31)+
(0.17*8.74)+(0.11*3.15)+(0.09*0.85)+
(0.08*5.81)+(0.06*11.04)=−5.7222905

Ma-09 t=22 SRI=(0.41*17.43)+(0.25*1.02)+
(0.12*10.74)+(0.08*1.72)+(0.07*0.29)+
(0.05*3.10)+(0.02*10.05)=−5.5989857

Apr-09 t=23 SRI=(0.37*7.09)+(0.22*12.37)+
(0.16*3.88)+(0.14*4.24)+(0.07*18.88)+
(0.03*1.83)+(0.01*1.27)=7.92255339

May-09 t=24 SRI=(0.52*1.96)+(0.23*2.96)+
(0.11*1.57)+(0.07*3.03)+(0.04*4.74)+
(0.02*4.32)+(0.01*5.69)=2.30608242

Jun-09 t=25 SRI=(0.49*0.12)+(0.26*3.35)+
(0.14*7.30)+(0.05*9.14)+(0.03*4.23)+
(0.02*15.32)+(0.01*4.61)=−2.1836578

Jul-09 t=26 SRI=(0.34*2.97)+(0.27*15.93)+
(0.18*1.19)+(0.13*6.37)+(0.04*0.64)+
(0.03*4.58)+(0.01*8.78)=2.75373227

Aug-09 t=27 SRI=(0.28*6.81)+(0.24*5.74)+
(0.21*8.64)+(0.18*2.01)+(0.06*0.28)+
(0.02*8.36)+(0.01*8.63)=5.69431573

Sep-09 t=28 SRI=(0.51*6.34)+(0.19*2.17)+
(0.15*3.30)+(0.09*12.33)+(0.03*2.84)+
(0.02*1.36)+(0.01*5.24)=1.98013163

Oct-09 t=29 SRI=(0.48*3.93)+(0.21*4.84)+
(0.14*9.47)+(0.08*4.88)+(0.04*4.73)+
(0.03*5.63)+(0.02*0.85)=−1.4287312

Nov-09 t=30 SRI=(0.35*2.48)+(0.17*4.47)+
(0.15*1.90)+(0.13*1.78)+(0.09*5.30)+
(0.07*0.24)+(0.04*0.22)=2.61301774

Adding a scalar then produces the Sentiment Risk Index for periods t=20 to t=30.

Sentiment Risk Index Calculation

Jan-09 t=20 SRI=6.65355097+
100=106.653551=Sentiment Risk Index

Feb-09 t=21 SRI=−5.7222905+
100=94.2777095=Sentiment Risk Index

Mar-09 t=22 SRI=−5.5989857+
100=94.4010143=Sentiment Risk Index

Apr-09 t=23 SRI=7.9225339+100=107.922553=Sentiment Risk Index

May-09 t=24 SRI=2.30608242+
100=102.306082=Sentiment Risk Index

Jun-09 t=25 SRI=−2.1836578+
100=97.8163422=Sentiment Risk Index

Jul-09 t=26 SRI=2.75373227+100=102.753732=Sentiment Risk Index

Aug-09 t=27 SRI=5.69431573+
100=105.694316=Sentiment Risk Index

Sep-09 t=28 SRI=1.98013163+
100=101.980132=Sentiment Risk Index

Oct-09 t=29 SRI=−0.4287312+
100=98.5712688=Sentiment Risk Index

Nov-09 t=30 SRI=2.61301774+
100=102.613018=Sentiment Risk Index

Since the data were assumed to arrive simultaneously at each time period, the matrix did not have a tattered edge, i.e., the matrix was balanced and so a standard correlation matrix was obtained and the eigendecomposition was performed recursively (note that standard PCA is nor performed recursively), and there was no need for ARIMA, arithmetic, or logarithmic extrapolation or for the Kalman Filter to be applied.

Alternatively, we can assume the more realistic case where some data may be missing, and data arrive spontaneously, rather than simultaneously. In this case, the MPCA-KF algorithm would calculate the composite sentiment indicator as follows:

1) Load data: Excel, ascii, or other standard formats, or connect to API feeds. The user specifies data sources. The program automatically detects number of data series and arrange data from left to right in chronological order, with the data series having the oldest start date on the leftmost column, and the data series having the newest start date on the rightmost column;
2) Normalize data and/or perform any transformations. The program gives basic functionality: log differences, basic calculations, change frequency (eg. convert weekly data to monthly, monthly to quarterly, etc.). In this example log differences are calculated.
3) Define ramp-up period to obtain initial values; designate the first n observations to be the ramp-up window to obtain first set of Principal Components. The user designates a time period as the ramp-up period, for example, from t=1 to t=20. The program automatically detects if there are any missing observations in the ramp-up period. The user specifies how to deal with any missing observations in the ramp-up period: 1) estimate by ARIMA; 2) logarithmic interpolation; 3) arithmetic interpolation; 4) user defined method. In this example, logarithmic interpolation is selected.
4) Choose whether principal components will be estimated on: 1) standard correlation matrix; 2) standard covariance matrix; 3) matrix of pairwise correlations, or 4) matrix of pairwise covariances. In this example, a matrix of pairwise correlations is selected.
5) Perform eigendecomposition and obtain first set of principal components 6) The program designates a placeholder for series for PC1, PC2 . . . . PCn
7) Once the initial values have been obtained, a recursive PCA calculation begins, i.e., repeat steps 5 and 6, now on matrix of data for t=1 to t=21, then on matrix for t=1 to t=22, and so on, until t=30.
8) The program automatically detects which series are available at each point in time. That is, if a series is revised, the revision enters concurrently with the unrevised data, or the user can elect to have the revised data replace the unrevised data. Alternatively, a revision difference series can be calculated. If a series is discontinued or a new series is introduced at a given point in time, the program detects what data are in the Information Set at any given point in time. This means that the calculation is done "on the fly" only on the information available at each point in time. The program detects the Information Set at each point in time. The user specifies via a wizard in the GUI whether the revision data should a) enter the calculation concurrently with the unrevised data, b) replace the unrevised data as soon as the revision is available, or c) calculate and utilize the revision difference series.

9) If there is a tattered edge of data at the end of any sample period at any point in time, that is, if due to spontaneous arrival of data (due to different publication dates), then the program estimates data to fill in the missing values, or a Kalman Filter is applied to the tattered edge.

The user selects from various options on how to handle the tattered edge of data at the end of the sample period. The user can choose to estimate missing data points at the tattered edge with: 1) Kalman Filter; 2) ARIMA estimation; 3) Logarithmic Extrapolation; 4) Arithmetic Extrapolation; or, 5) a user-defined method. The user can also choose to generate several candidate series by more than one method simultaneously. For example, choose Kalman Filter and ARIMA at the same time and generate 2 candidate factor series. In this example, missing data points at the tattered edge are estimated by the Kalman Filter.

Such a calculation is performed continually by automatically checking and detecting the shape of the matrix. If spontaneously arrived data have caused a tattered edge at the end of the dataset, then the data can be filled in with estimates, either by ARIMA or arithmetic or logarithmic extrapolation, or the Kalman Filter can be applied. Once actual data have arrived, the estimated data can be replaced by the actual values. As long as the edge remains tattered, estimates are calculated to square the tattered edge. Once actual data have arrived to complete the tattered edge, the estimates are substituted by the actual values, and the calculation of recursive principal components analysis resumes, and the recursive eigendecomposition performed. When new data arrives to cause a new tattered edge in the next time period, the estimation procedure is repeated such that the edge becomes square, and the eigendecomposition is performed again. The estimates are substituted with actual data when it arrives, and the eigendecomposition is performed, and so on, repeating the process as each new data point arrives. Several alternative signal extraction procedures can be applied simultaneously to generate several candidate factors, and they can be evaluated using econometric techniques to determine which is the most accurate, i.e., which has the lowest forecast error.

The calculation can be performed as follows. Suppose, for example, we have the following data representing monthly changes (calculated by the log differences) in the values for 7 data series:

| | | ISM, PHIL, ICS, CCI, BBG, TWIT, and NEWS. | | | | | |
|---|---|---|---|---|---|---|---|
| | | ISM | PHIL | ICS | CCI | BBG | TWIT | NEWS |
| June 07 | t = 1 | 8.88 | 3.44 | 8.35 | −2.73 | −7.25 | −11.12 | 6.79 |
| July 07 | t = 2 | 9.76 | −5.64 | −5.07 | 6.05 | 4.09 | 12.10 | 10.66 |
| August 07 | t = 3 | −6.08 | −3.46 | −4.20 | −0.82 | 5.08 | −32.69 | −19.65 |
| September 07 | t = 4 | −11.47 | 0.18 | 0.92 | 2.60 | 6.72 | 12.95 | 3.53 |
| October 07 | t = 5 | 14.52 | −0.30 | −2.36 | −2.68 | −7.58 | −2.50 | 14.42 |
| November 07 | t = 6 | −1.01 | 2.46 | 5.29 | 3.95 | −2.43 | 5.82 | 7.03 |
| December 07 | t = 7 | 1.79 | 9.60 | 9.75 | −1.35 | 1.66 | 8.38 | 2.04 |
| January 08 | t = 8 | −2.95 | −8.89 | −11.90 | 2.77 | 6.83 | −32.77 | −6.96 |
| February 08 | t = 9 | −2.97 | −4.51 | | 1.47 | 2.94 | 27.61 | −10.93 |
| March 08 | t = 10 | 7.26 | 0.92 | −4.84 | 0.15 | −2.22 | 9.07 | 5.76 |
| April 08 | t = 11 | −12.52 | 0.43 | −3.29 | −18.94 | −15.50 | −7.97 | −1.56 |
| May 08 | t = 12 | −8.27 | −2.40 | 2.71 | −10.44 | 5.31 | −4.85 | −33.02 |
| June 08 | t = 13 | −2.80 | −1.57 | −2.93 | 9.89 | −4.37 | 5.02 | 0.10 |
| July 08 | t = 14 | 3.74 | −1.02 | 1.48 | 6.32 | 6.14 | −17.49 | −7.89 |
| August 08 | t = 15 | −6.71 | 1.65 | 1.96 | −2.30 | −8.03 | 8.48 | 0.90 |
| September 08 | t = 16 | 8.15 | 3.58 | 0.86 | −2.17 | −0.53 | −9.49 | 1.77 |
| October 08 | t = 17 | −1.36 | −1.28 | −3.33 | 4.39 | 2.83 | 13.04 | 5.23 |
| November 08 | t = 18 | 2.11 | −1.11 | 2.76 | 3.44 | 5.53 | −14.88 | 3.27 |
| December 08 | t = 19 | 3.85 | 0.31 | 1.07 | −3.44 | −0.98 | −5.10 | 7.18 |
| January 09 | t = 20 | 18.45 | 4.89 | 2.80 | 3.86 | 5.01 | −5.60 | 14.45 |
| February 09 | t = 21 | −10.34 | −8.74 | −5.31 | −0.85 | −3.15 | −5.81 | 11.04 |
| March 09 | t = 22 | 10.74 | 1.72 | −1.02 | 3.10 | 10.05 | −17.43 | 0.29 |
| April 09 | t = 23 | 4.24 | −1.27 | 7.09 | 3.88 | 1.83 | 18.88 | 12.37 |
| May 09 | t = 24 | 4.74 | 2.96 | 3.03 | 1.57 | 1.96 | −5.69 | 4.32 |
| June 09 | t = 25 | −0.12 | −3.35 | −7.30 | −9.14 | −4.23 | 15.32 | 4.61 |
| July09 | t = 26 | −8.78 | 4.58 | 0.64 | 1.19 | −6.37 | 15.93 | −2.97 |
| August 09 | t = 27 | 8.36 | 8.64 | 8.63 | 2.01 | 6.81 | −0.28 | 5.74 |
| September 09 | t = 28 | −1.36 | −12.33 | −2.84 | 5.24 | 2.17 | 6.34 | −3.30 |
| October 09 | t = 29 | 4.73 | 5.63 | 4.84 | −3.93 | 0.85 | −9.47 | 4.88 |
| November 09 | t = 30 | | 4.47 | 1.90 | | | 2.48 | 0.22 |

Notice that at t=9, there is a missing value for ICS, and at the end of the sample period, at t=30, there is a tattered edge of data due to publication lags.

Suppose the MPCA-KF algorithm described above is applied, and assuming for ease of exposition that the data items arrive simultaneously at each successive time period, except at the end of the sample period, at t=30.

At t=9, the missing data is estimated by logarithmic interpolation (user-selected method). The first 20 observations are utilized as a ramp-up period.

|  |  | ISM | PHIL | ICS | CCI | BBG | TWIT | NEWS |
|---|---|---|---|---|---|---|---|---|
| June 07 | t = 1 | 8.88 | 3.44 | 8.35 | −2.73 | −7.25 | −11.12 | 6.79 |
| July 07 | t = 2 | 9.76 | −5.64 | −5.07 | 6.05 | 4.09 | 12.10 | 10.66 |
| August 07 | t = 3 | −6.08 | −3.46 | −4.20 | −0.82 | 5.08 | −32.69 | −19.65 |
| September 07 | t = 4 | −11.47 | 0.18 | 0.92 | 2.60 | 6.72 | 12.95 | 3.53 |
| October 07 | t = 5 | 14.52 | −0.30 | −2.36 | −2.68 | −7.58 | −2.50 | 14.42 |
| November 07 | t = 6 | −1.01 | 2.46 | 5.29 | 3.95 | −2.43 | 5.82 | 7.03 |
| December 07 | t = 7 | 1.79 | 9.60 | 9.75 | −1.35 | 1.66 | 8.38 | 2.04 |
| January 08 | t = 8 | −2.95 | −8.89 | −11.90 | 2.77 | 6.83 | −32.77 | −6.96 |
| February 08 | t = 9 | −2.97 | −4.51 | 5.36 | 1.47 | 2.94 | 27.61 | −10.93 |
| March 08 | t = 10 | 7.26 | 0.92 | −4.84 | 0.15 | −2.22 | 9.07 | 5.76 |
| April 08 | t = 11 | −12.52 | 0.43 | −3.29 | −18.94 | −15.50 | −7.97 | −1.56 |
| May 08 | t = 12 | −8.27 | −2.40 | 2.71 | −10.44 | 5.31 | −4.85 | −33.02 |
| June 08 | t = 13 | −2.80 | −1.57 | −2.93 | 9.89 | −4.37 | 5.02 | 0.10 |
| July 08 | t = 14 | 3.74 | −1.02 | 1.48 | 6.32 | 6.14 | −17.49 | −7.89 |
| August 08 | t = 15 | −6.71 | 1.65 | 1.96 | −2.30 | −8.03 | 8.48 | 0.90 |
| September 08 | t = 16 | 8.15 | 3.58 | 0.86 | −2.17 | −0.53 | −9.49 | 1.77 |
| October 08 | t = 17 | −1.36 | −1.28 | −3.33 | 4.39 | 2.83 | 13.04 | 5.23 |
| November 08 | t = 18 | 2.11 | −1.11 | 2.76 | 3.44 | 5.53 | −14.88 | 3.27 |
| December 08 | t = 19 | 3.85 | 0.31 | 1.07 | −3.44 | −0.98 | −5.10 | 7.18 |
| January 09 | t = 20 | 18.45 | 4.89 | 2.80 | 3.86 | 5.01 | −5.60 | 14.45 |

The first 20 observations are utilized as a ramp-up period and a set of initial weights, summing to 1, are calculated at t=20 based on the matrix of pairwise correlations, with pairwise correlation values bounded between −1 and 1. A matrix of pairwise correlations is obtained for the 20-month period covering June 2007 to January 2009:

| Matrix of Pairwise Correlations June 2007-January 2009 | | | | | | | |
|---|---|---|---|---|---|---|---|
|  | ISM | PHIL | ICS | CCI | BBG | TWIT | NEWS |
| ISM | 1 | 0.280055 | 0.125079 | 0.329044 | 0.046757 | −0.031162 | 0.610783 |
| PHIL | 0.280055 | 1 | 0.751053 | −0.169945 | −0.313332 | 0.20769 | 0.38833 |
| ICS | 0.125079 | 0.751053 | 1 | −0.089229 | −0.083228 | 0.281934 | 0.077864 |
| CCI | 0.329044 | −0.169945 | −0.089229 | 1 | 0.536445 | 0.150346 | 0.297538 |
| BBG | 0.046757 | −0.313332 | −0.083228 | 0.536445 | 1 | −0.138821 | −0.30494 |
| TWIT | −0.031162 | 0.20769 | 0.281934 | 0.150346 | −0.138821 | 1 | 0.28608 |
| NEWS | 0.610783 | 0.38833 | 0.077864 | 0.297538 | −0.30494 | 0.28608 | 1 |

An eigendecomposition is then performed on the t=20, correlation matrix and the following weights are thus obtained:

| Composite Sentiment Index Calculation |
|---|
| January 09 t = 20 CSI = 0.39 PHIL 0.18 ISM 0.14 BBG 0.11 TWIT 0.09 ICS 0.07 NEWS 0.02 CCI | which result in the following linear combination and calculation of the Composite Index at t=20.

Composite Sentiment Index Calculation $$\text{Jan-09 } t=20 \text{ } CSI=(0.39*4.89)+(0.18*18.45)+ \\ (0.14*5.01)+(0.11*-5.60)+(0.09*2.80)+ \\ (007*14.45)+(0.02*3.86)=6.65355097$$

Thus, PC1, the first principal component, has a value of 6.65 at t=20, and becomes the first observation of the series representing the Composite Sentiment Index.

Next, at t=21, the calculation is repeated. For ease of exposition, it is assumed that all data items arrive simultaneously at t=21 (i.e., there is no tattered edge). A new matrix of pairwise correlations can thus be obtained at t=21, for the 21-month period covering June 2007 to February 2009.

| Matrix of Pairwise Correlations June 2007-February 2009 | | | | | | | |
|---|---|---|---|---|---|---|---|
| | ISM | PHIL | ICS | CCI | BBG | TWIT | NEWS |
| ISM | 1 | 0.368545 | 0.185727 | 0.323169 | 0.079517 | −0.013852 | 0.509614 |
| PHIL | 0.368545 | 1 | 0.760258 | −0.14017 | −0.228691 | 0.210349 | 0.252066 |
| ICS | 0.185727 | 0.760258 | 1 | −0.079567 | −0.051989 | 0.286316 | 0.02461 |
| CC | 0.323169 | −0.14017 | −0.079567 | 1 | 0.535939 | 0.151677 | 0.28461 |
| BBG | 0.079517 | −0.228691 | −0.051989 | 0.535939 | 1 | −0.131162 | −0.321035 |
| TWIT | −0.013852 | 0.210349 | 0.286316 | 0.151677 | −0.131162 | 1 | 0.268098 |
| NEWS | 0.509614 | 0.252066 | 0.02461 | 0.28461 | −0.321035 | 0.268098 | 1 |

The eigendecomposition can again be performed on the t=21 matrix of pairwise correlations and the following weights can thus be obtained:

| Composite Sentiment Index Calculation | | | | | | | | | |
|---|---|---|---|---|---|---|---|---|---|
| January 09 | t = 20 | CSI = | 0.39 PHIL | 0.18 ISM | 0.14 BBG | 0.11 TWIT | 0.09 ICS | 0.07 NEWS | 0.02 CCI |
| February 09 | t = 21 | CSI = | 0.28 ISM | 0.21 ICS | 0.17 PHIL | 0.12 BBG | 0.09 CCI | 0.07 TWIT | 0.06 NEWS |

This results in the following linear combination and calculation of the Composite Sentiment Index at t=21.

| Composite Sentiment Index Calculation |
|---|
| January 09   t = 20   CSI = ( 0.39 * 4.89 ) + ( 0.18 * 18.45 ) + ( 0.14 * 5.01 ) + ( 0.11 * −5.60 ) + ( 0.09 * 2.80 ) + ( 0.07 * 14.45) + ( 0.02 * 3.86 ) = 6.65355097 |
| February 09   t = 21   CSI = ( 0.28 * −10.34 ) + ( 0.21 * −5.31 ) + ( 0.17 * −8.74 ) + ( 0.11 * −3.15 ) + ( 0.09 * −0.85 ) + ( 0.08 * −5.81 ) + ( 0.06 * 11.04 ) = −5.7222905 |

Thus PC1 (the Composite Sentiment Index) has a value of −5.72 at t=21.

The PC1 series are collected and stored at each time period:

$t=20, PC1=\text{Composite Sentiment Index}=6.65$ $t=21, PC1=\text{Composite Sentiment Index}=-5.72$ The process can be continued, and thus at each successive time period t+1, a new row of observations can be added to the matrix (data items arrive simultaneously in this example at each time period until the very end), a new matrix of pairwise correlations is determined at each point in time, a new eigendecomposition is performed, a new set of weights are obtained, a new PC1 (first principal component), i.e., a new value of the Composite Sentiment Index is calculated. The procedure continues recursively, with a new set of weights obtained at each period until t=30. The weights determined at each time period sum to 1. It is noted that the weights could sum to any fixed number.

At t=30, missing data for ISM, CCI, and BBG are estimated by means of a Kalman Filter (the user could have also selected ARIMA, or logarithmic extrapolation, or arithmetic extrapolation or some other method).

| | | ISM | PHIL | ICS | CCI | BBG | TWIT | NEWS |
|---|---|---|---|---|---|---|---|---|
| June 07 | t = 1 | 8.88 | 3.44 | 8.35 | −2.73 | −7.25 | −11.12 | 6.79 |
| July 07 | t = 2 | 9.76 | −5.64 | −5.07 | 6.05 | 4.09 | 12.10 | 10.66 |
| August 07 | t = 3 | −6.08 | −3.46 | −4.20 | −0.82 | 5.08 | −32.69 | −19.65 |
| September 07 | t = 4 | −11.47 | 0.18 | 0.92 | 2.60 | 6.72 | 12.95 | 3.53 |
| October 07 | t = 5 | 14.52 | −0.30 | −2.36 | −2.68 | −7.58 | −2.50 | 14.42 |
| November 07 | t = 6 | −1.01 | 2.46 | 5.29 | 3.95 | −2.43 | 5.82 | 7.03 |
| December 07 | t = 7 | 1.79 | 9.60 | 9.75 | −1.35 | 1.66 | 8.38 | 2.04 |
| January 08 | t = 8 | −2.95 | −8.89 | −11.90 | 2.77 | 6.83 | −32.77 | −6.96 |
| February 08 | t = 9 | −2.97 | −4.51 | 5.36 | 1.47 | 2.94 | 27.61 | −10.93 |
| March 08 | t = 10 | 7.26 | 0.92 | −4.84 | 0.15 | −2.22 | 9.07 | 5.76 |
| April 08 | t = 11 | −12.52 | 0.43 | −3.29 | −18.94 | −15.50 | −7.97 | −1.56 |

-continued

|            |        | ISM    | PHIL   | ICS   | CCI    | BBG   | TWIT   | NEWS   |
|---|---|---|---|---|---|---|---|---|
| May 08       | t = 12 | −8.27  | −2.40  | 2.71  | −10.44 | 5.31  | −4.85  | −33.02 |
| June 08      | t = 13 | −2.80  | −1.57  | −2.93 | 9.89   | −4.37 | 5.02   | 0.10   |
| July 08      | t = 14 | 3.74   | −1.02  | 1.48  | 6.32   | 6.14  | −17.49 | −7.89  |
| August 08    | t = 15 | −6.71  | 1.65   | 1.96  | −2.30  | −8.03 | 8.48   | 0.90   |
| September 08 | t = 16 | 8.15   | 3.58   | 0.86  | −2.17  | −0.53 | −9.49  | 1.77   |
| October 08   | t = 17 | −1.36  | −1.28  | −3.33 | 4.39   | 2.83  | 13.04  | 5.23   |
| November 08  | t = 18 | 2.11   | −1.11  | 2.76  | 3.44   | 5.53  | −14.88 | 3.27   |
| December 08  | t = 19 | 3.85   | 0.31   | 1.07  | −3.44  | −0.98 | −5.10  | 7.18   |
| January 09   | t = 20 | 18.45  | 4.89   | 2.80  | 3.86   | 5.01  | −5.60  | 14.45  |
| February 09  | t = 21 | −10.34 | −8.74  | −5.31 | −0.85  | −3.15 | −5.81  | 11.04  |
| March 09     | t = 22 | 10.74  | 1.72   | −1.02 | 3.10   | 10.05 | −17.43 | 0.29   |
| April 09     | t = 23 | 4.24   | −1.27  | 7.09  | 3.88   | 1.83  | 18.88  | 12.37  |
| May 09       | t = 24 | 4.74   | 2.96   | 3.03  | 1.57   | 1.96  | −5.69  | 4.32   |
| June 09      | t = 25 | −0.12  | −3.35  | −7.30 | −9.14  | −4.23 | 15.32  | 4.61   |
| July 09      | t = 26 | −8.78  | 4.58   | 0.64  | 1.19   | −6.37 | 15.93  | −2.97  |
| August 09    | t = 27 | 8.36   | 8.64   | 8.63  | 2.01   | 6.81  | −0.28  | 5.74   |
| September 09 | t = 28 | −1.36  | −12.33 | −2.84 | 5.24   | 2.17  | 6.34   | −3.30  |
| October 09   | t = 29 | 4.73   | 5.63   | 4.84  | −3.93  | 0.85  | −9.47  | 4.88   |
| November 09  | t = 30 | −0.24  | 4.47   | 1.90  | 1.78   | 5.30  | 2.48   | 0.22   |

The weights determined at each time period sum to 1.

| Weights |      |      |      |      |      |      |      |       |
|---|---|---|---|---|---|---|---|---|
|     |     | w1   | w2   | w3   | w4   | w5   | w6   | w7   | TOTAL |
| t=  | 20  | 0.39 | 0.18 | 0.14 | 0.11 | 0.09 | 0.07 | 0.02 | =1 |
| t=  | 21  | 0.28 | 0.21 | 0.17 | 0.11 | 0.09 | 0.08 | 0.06 | =1 |
| t=  | 22  | 0.41 | 0.25 | 0.12 | 0.08 | 0.07 | 0.05 | 0.02 | =1 |
| t=  | 23  | 0.37 | 0.22 | 0.16 | 0.14 | 0.07 | 0.03 | 0.01 | =1 |
| t=  | 24  | 0.52 | 0.23 | 0.11 | 0.07 | 0.04 | 0.02 | 0.01 | =1 |
| t=  | 25  | 0.49 | 0.26 | 0.14 | 0.05 | 0.03 | 0.02 | 0.01 | =1 |
| t=  | 26  | 0.34 | 0.27 | 0.18 | 0.13 | 0.04 | 0.03 | 0.01 | =1 |
| t=  | 27  | 0.28 | 0.24 | 0.21 | 0.18 | 0.06 | 0.02 | 0.01 | =1 |
| t=  | 28  | 0.51 | 0.19 | 0.15 | 0.09 | 0.03 | 0.02 | 0.01 | =1 |
| t=  | 29  | 0.48 | 0.21 | 0.14 | 0.08 | 0.04 | 0.03 | 0.02 | =1 |
| t=  | 30  | 0.35 | 0.17 | 0.15 | 0.13 | 0.09 | 0.07 | 0.04 | =1 |

At each time period, a vector, PC1 (the Composite Sentiment Indicator), is determined, that is, a linear combination of the data elements is determined by the signal extraction algorithm, whereby the algorithm determines which data element is exerting the most to the least influence on the system at that point in time.

| Composite Sentiment Index Calculation |        |     |   |      |      |      |      |      |      |      |      |      |      |      |      |      |      |
|---|---|---|---|---|---|---|---|---|---|---|---|---|---|---|---|---|---|
| January 09   | t = 20 | CSI | = | 0.39 | PHIL | 0.18 | ISM  | 0.14 | BBG  | 0.11 | TWIT | 0.09 | ICS  | 0.07 | NEWS | 0.02 | CCI  |
| February 09  | t = 21 | CSI | = | 0.28 | ISM  | 0.21 | ICS  | 0.17 | PHIL | 0.12 | BBG  | 0.09 | CCI  | 0.07 | TWIT | 0.06 | NEWS |
| March 09     | t = 22 | CSI | = | 0.41 | TWIT | 0.25 | ICS  | 0.12 | ISM  | 0.08 | PHIL | 0.07 | NEWS | 0.05 | CCI  | 0.02 | BBG  |
| April 09     | t = 23 | CSI | = | 0.37 | ICS  | 0.22 | NEWS | 0.16 | CCI  | 0.14 | ISM  | 0.07 | TWIT | 0.03 | BBG  | 0.01 | PHIL |
| May 09       | t = 24 | CSI | = | 0.52 | BBG  | 0.23 | PHIL | 0.11 | CCI  | 0.07 | ICS  | 0.04 | ISM  | 0.02 | NEWS | 0.01 | TWIT |
| June 09      | t = 25 | CSI | = | 0.49 | ISM  | 0.26 | PHIL | 0.14 | ICS  | 0.05 | CCI  | 0.03 | BBG  | 0.02 | TWIT | 0.01 | NEWS |
| July 09      | t = 26 | CSI | = | 0.34 | NEWS | 0.27 | TWIT | 0.18 | CCI  | 0.13 | BBG  | 0.04 | ICS  | 0.03 | PHIL | 0.01 | ISM  |
| August 09    | t = 27 | CSI | = | 0.28 | BBG  | 0.24 | NEWS | 0.21 | PHIL | 0.18 | CCI  | 0.06 | TWIT | 0.02 | ISM  | 0.01 | ICS  |
| September 09 | t = 28 | CSI | = | 0.51 | TWIT | 0.19 | BBG  | 0.15 | NEWS | 0.09 | PHIL | 0.03 | ICS  | 0.02 | ISM  | 0.01 | CCI  |
| October 09   | t = 29 | CSI | = | 0.48 | CCI  | 0.21 | ICS  | 0.14 | TWIT | 0.08 | NEWS | 0.04 | ISM  | 0.03 | PHIL | 0.02 | BBG  |
| November09   | t = 30 | CSI | = | 0.35 | TWIT | 0.17 | PHIL | 0.15 | ICS  | 0.13 | CCI  | 0.09 | BBG  | 0.07 | ISM  | 0.04 | NEWS |

Substituting back in the values of the data matrix gives the following linear combination of weighted variables, and PC1 values:

Composite Sentiment Index Calculation

Jan-09 t=20 CSI=(0.39*4.89)+(0.18*18.45)+
(0.14*5.01)+(0.11*−5.60)+(0.09*2.80)+(0.07*
14.45)+(0.02*3.86)=6.65355097

Feb-09 t=21 CSI=(0.28*−10.34)+(0.21*−5.31)+
(0.17*−8.74)+(0.11*−3.15)+(0.09*−0.85)+
(0.08*−5.81)+(0.06*11.04)=−5.7222905

Mar-09 t=22 CSI=(0.41*−17.43)+(0.25*−1.02)+
(0.12*10.74)+(0.08*1.72)+(0.07*0.29)+
(0.05*3.10)+(0.02*10.05)=−5.5989857

Apr-09 t=23 CSI=(0.37*7.09)+(0.22*12.37)+
(0.16*3.88)+(0.14*4.24)+(0.07*18.88)+
(0.03*1.83)+(0.01*−1.27)=7.92255339

May-09 t=24 CSI=(0.52*1.96)+(0.23*2.96)+
(0.11*1.57)+(0.07*3.03)+(0.04*4.74)+
(0.02*4.32)+(0.01*−5.69)=2.30608242

Jun-09 t=25 CSI=(0.49*−0.12)+(0.26*−3.35)+
(0.14*−7.30)+(0.05*−9.14)+(0.03*−4.23)+
(0.02*15.32)+(0.01*4.61)=−2.1836578

Jul-09 t=26 CSI=(0.34*−2.97)+(0.27*15.93)+
(0.18*1.19)+(0.13*−6.37)+(0.04*0.64)+
(0.03*4.58)+(0.01*−8.78)=2.75373227

Aug-09 t=27 CSI=(0.28*6.81)+(0.24*5.74)+
(0.21*8.64)+(0.18*2.01)+(0.06*−0.28)+
(0.02*8.36)+(0.01*8.63)=5.69431573

Sep-09 t=28 CSI=(0.51*6.34)+(0.19*2.17)+(0.15*−
3.30)+(0.09*−12.33)+(0.03*−2.84)+(0.02*−
1.36)+(0.01*5.24)=1.98013163

Oct-09 t=29 CSI=(0.48*−3.93)+(0.21*4.84)+(0.14*−
9.47)+(0.08*4.88)+(0.04*4.73)+(0.03*5.63)+
(0.02*0.85)=−1.4287312

Nov-09 t=30 CSI=(0.35*2.48)+(0.17*4.47)+
(0.15*1.90)+(0.13*1.78)+(0.09*5.30)+(0.07*−
0.24)+(0.04*0.22)=2.61301774

And the PC1 series is:

| Composite Sentiment Index Calculation | | |
|---|---|---|
| January 09 | t = 20 | CSI = 6.65355097 |
| February 09 | t = 21 | CSI = −5.7222905 |
| March 09 | t = 22 | CSI = −5.5989857 |
| April 09 | t = 23 | CSI = 7.92255339 |
| May 09 | t = 24 | CSI = 2.30608242 |
| June 09 | t = 25 | CSI = −2.1836578 |
| July 09 | t = 26 | CSI = 2.75373227 |
| August 09 | t = 27 | CSI = 5.69431573 |
| September 09 | t = 28 | CSI = 1.98013163 |
| October 09 | t = 29 | CSI = −1.4287312 |
| November 09 | t = 30 | CSI = 2.61301774 |

At t=9, the missing data is estimated by logarithmic interpolation (user-selected method).

Since the data were assumed to arrive simultaneously at each time period after that, there was no need for additional ARIMA, arithmetic, or logarithmic extrapolation or for the Kalman Filter to be applied, until t=30. But, the estimate at t=30 could have occurred at any time period after the initial ramp-up window, which in this example was selected at t=20.

It is noted that the properties of a matrix of pairwise correlations (covariances) are not quite the same as those of a standard correlation (covariance) matrix. In the case that the matrix of pairwise correlations (or covariances) is not positive semidefinite, then either 1) the data matrix is forced to become balanced by filling in the missing values by estimation using ARIMA, arithmetic, or logarithmic interpolation or extrapolation or some other method, and therefore the calculation is performed on a standard correlation or covariance matrix; or 2) t a Kalman filter is applied over the entire unbalanced dataset. The Program is prepared for the case that a matrix of pairwise correlations (or covariances) is not positive semidefinite, and offers an alternative calculation in this case. In the case that the matrix is not positive semidefinite, the user-defined alternative procedures (chosen from a set of specified contingency procedures) automatically kick in to provide alternative calculations for the factors.

Once the factor has been obtained, it can be analyzed on a standard analytical platform which can include graphs and summary statistics, as well as basic econometric analysis, such as OLS, MLE, GMM, etc., with current, lagged, linear and non-linear modeling capabilities. The Program allows a user to import other data to use in the analysis, for comparisons, making forecasts, etc. A forecast error evaluation module is included to allow for testing of the factors. If the calculation utilizes real-time data via an API feed, the program can perform the calculation dynamically (in near real-time), and generate a numerical value for the factor (in real-time, an indicator or index) dynamically (in near real-time), as well as a graph, which updates dynamically (in near real-time).

The above-presented description and figures are intended by way of example only and are not intended to limit the present disclosure in any way except as set forth in the following claims. It is particularly noted that the persons skilled in the art can readily combine the various technical aspects of the various exemplary embodiments described. For example, different known and novel signal extraction algorithms could be loaded in to the system and candidate synthetic data proxy variables could be judged not only by minimum forecast error, but also by minimum forecast variance or some other measure. Alternatively, a user may devise a proprietary signal extraction algorithm by modifying and customizing one or more known signal extraction algorithms in the system. Similarly, weights can be determined by some other method, such as arbitrarily, user-configured, etc. Alternatively, for example, the weights could be determined by some other type of optimization or signal extraction method.

The invention claimed is:

1. A method for extracting a signal from a data set, the method comprising:
   retrieving, by at least one processor, data from a plurality of data sources;
   generating, by the at least one processor, a correlation matrix or a covariance matrix based on the retrieved data;
   performing, by the at least one processor, an eigenvalue decomposition on the correlation matrix or the covariance matrix to determine a set of eigenvector loadings;
   converting, by the at least one processor, a result of the eigenvalue decomposition into at least one indicator of a common signal among the retrieved data, wherein converting the result of the eigenvalue decomposition into the at least one indicator of the common signal comprises applying at least one loading from the set of eigenvector loadings as a weight to at least one corresponding observation in the retrieved data from the plurality of data sources; and recursively repeating the retrieving, the generating, the performing, and the converting;

wherein the recursively repeating further comprises recursively generating an information set of the retrieved data from the plurality of data sources, wherein recursively generating the information set comprises determining a number of observations and a number of data sources available at each recursion and generating a first correlation matrix or covariance matrix based on the information set to begin a recursive eigenvalue decomposition, successively expanding the information set to include additional observations and data sources that may become available, in each recursion, and generating another correlation matrix or covariance matrix in each recursion based on the expanded information set.

2. The method of claim 1, wherein the recursively repeating the retrieving, the generating, the performing, and the converting is performed to extract the signal from the data set based on application of the at least one loading from the set of eigenvector loadings as a weight to the at least one corresponding observation in the retrieved data at each recursion.

3. The method of claim 1, wherein the information set has n rows corresponding to n observation periods and k columns corresponding to k data sources, wherein recursively generating the information set further comprises generating a first correlation matrix or covariance matrix based on the n-row and k-column data matrix to begin a recursive eigenvalue decomposition, successively expanding the data matrix to contain i additional rows and j additional columns in each recursion, and generating another correlation matrix or covariance matrix in each recursion based on the expanded data matrix, wherein n, i,k, and j are integers.

4. The method of claim 1, wherein the retrieved data comprises missing data, the method further comprising:

generating, by the at least one processor, additional data to complete the missing data from the retrieved data using at least one of: a Kalman Filter, an autoregressive integrated moving average, an arbitrary method, an arithmetic interpolation, a logarithmic interpolation, an arithmetic extrapolation, a logarithmic extrapolation, a linear regression, and a nonlinear regression;

wherein the correlation matrix or the covariance matrix is generated based on the retrieved data and the additional data.

5. The method of claim 4, wherein the additional data is automatically replaced by retrieved data when previously missing data become available for retrieval.

6. The method of claim 4, further comprising:

transforming, by the at least one processor, the retrieved data and the additional data by performing at least one of:

cleaning the retrieved data;
removing outliers from the retrieved data;
changing the frequency of the retrieved data;
changing the format of the retrieved data;
applying a mathematical transformation to the retrieved data;
applying a statistical transformation to the retrieved data;
applying natural language processing techniques to the retrieved data;
applying semantic filtering techniques to the retrieved data;
applying machine learning techniques to the retrieved data;
applying a scoring algorithm to the retrieved data;
applying a scaling procedure to the retrieved data;
scaling the retrieved data to have mean zero and unit variance; and
normalizing the retrieved data.

7. The method of claim 1, wherein the correlation matrix or the covariance matrix comprises one of: a standard correlation matrix, a standard covariance matrix, a matrix of pairwise correlations, and a matrix of pairwise covariances.

8. The method of claim 1, wherein the plurality of data sources comprise at least one of a news source, a social media source, a financial information source, an economic information source, and an internet-based information source, the method further comprising generating a metric based on information contained in the at least one of a news source, a social media source, a financial information source, an economic information source, and an internet-based information source.

9. The method of claim 8, wherein the metric is generated based on at least one of positive words and negative words present in the at least one of a news source, a social media source, a financial information source, an economic information source, and an internet-based information source.

10. The method of claim 1, further comprising:

generating a series of correlation matrices or covariance matrices based on the retrieved data;

wherein performing the eigenvalue decomposition comprises performing the eigenvalue decomposition on a plurality of matrices in the series of correlation matrices or covariance matrices to determine a plurality of sets of eigenvector loadings.

11. The method of claim 1, wherein the at least one indicator of the common signal among the retrieved data comprises at least one of a news factor that is generated based on news information sources, a social media factor that is generated based on social media sources, a financial information factor that is generated based on financial information sources, an economic information factor that is generated based on economic information sources, and an internet-based information factor that is generated based on internet-based information sources.

12. The method of claim 11, wherein the at least one of the news factor, the social media factor, the financial information factor, the economic information factor, and the internet-based information factor comprises a sentiment measure based on at least one of a ratio of negative or positive words to positive or negative words, negative words to total words, and positive words to total words in at least one of the news information sources, the social media sources, the financial information sources, the economic information sources, and the internet-based information sources.

13. The method of claim 11, further comprising generating an index based on the at least one of the news factor, the social media factor, the financial information factor, the economic information factor and the internet-based information factor.

14. The method of claim 13, further comprising generating a forecast based on the index.

15. The method of claim 11, further comprising generating a forecast based on the at least one of the news factor, the social media factor, the financial information factor, the economic information factor and the internet-based information factor.

16. The method of claim 13, wherein generating the index comprises generating a composite index based on a plurality of factors including the news factor, the social media factor, the financial information factor, the economic information factor and/or the internet-based information factor.

17. The method of claim 13, further comprising generating at least one of an economic forecast and a forecast of asset prices based on the index.

18. The method of claim 1, wherein performing the eigenvalue decomposition comprises obtaining a set of principal components, wherein converting the result of the eigenvalue decomposition into the at least one indicator of the common signal comprises generating the at least one indicator of the common signal based on at least one of the principal components from the obtained set of principal components.

19. A system for extracting a signal from a data set, comprising:
- a least one processor; and
- a memory coupled to the at least one processor, wherein the memory stores computer readable program instructions that, when executed by the at least one processor, perform operations comprising:
  - retrieving, by the at least one processor, data from a plurality of data sources;
  - generating, by the at least one processor, a correlation matrix or a covariance matrix based on the retrieved data;
  - performing, by the at least one processor, an eigenvalue decomposition on the correlation matrix or the covariance matrix to determine a set of eigenvector loadings;
  - converting, by the at least one processor, a result of the eigenvalue decomposition into at least one indicator of a common signal among the retrieved data, wherein converting the result of the eigenvalue decomposition into the at least one indicator of the common signal comprises applying at least one loading from the set of eigenvector loadings as a weight to at least one corresponding observation in the retrieved data from the plurality of data sources; and
  - recursively repeating the retrieving, the generating, the performing, and the converting;
  - wherein the recursively repeating further comprises recursively generating an information set of the retrieved data from the plurality of data sources, wherein recursively generating the information set comprises determining a number of observations and a number of data sources available at each recursion and generating a first correlation matrix or covariance matrix based on the information set to begin a recursive eigenvalue decomposition, successively expanding the information set to include additional observations and data sources that may become available, in each recursion, and generating another correlation matrix or covariance matrix in each recursion based on the expanded information set.

20. A non-transitory medium storing computer program instructions for extracting a signal from a data set, wherein the medium stores computer readable program instructions that, when executed by at least one processor, cause the at least one processor to perform operations comprising:
- retrieving, by the at least one processor, data from a plurality of data sources;
- generating, by the at least one processor, a correlation matrix or a covariance matrix based on the retrieved data;
- performing, by the at least one processor, an eigenvalue decomposition on the correlation matrix or the covariance matrix to determine a set of eigenvector loadings;
- converting, by the at least one processor, a result of the eigenvalue decomposition into at least one indicator of a common signal among the retrieved data, wherein converting the result of the eigenvalue decomposition into the at least one indicator of the common signal comprises applying at least one loading from the set of eigenvector loadings as a weight to at least one corresponding observation in the retrieved data from the plurality of data sources; and
- recursively repeating the retrieving, the generating, the performing, and the converting;
- wherein the recursively repeating further comprises recursively generating an information set of the retrieved data from the plurality of data sources, wherein recursively generating the information set comprises determining a number of observations and a number of data sources available at each recursion and generating a first correlation matrix or covariance matrix based on the information set to begin a recursive eigenvalue decomposition, successively expanding the information set to include additional observations and data sources that may become available, in each recursion, and generating another correlation matrix or covariance matrix in each recursion based on the expanded information set.

\* \* \* \* \*